US011772545B2

(12) United States Patent
Levi et al.

(10) Patent No.: US 11,772,545 B2
(45) Date of Patent: Oct. 3, 2023

(54) APPARATUS, SYSTEM AND METHOD FOR CONTROLLING LIGHTING USING GATED IMAGING

(71) Applicant: BRIGHTWAY VISION LTD, Tirat Hacarmel (IL)

(72) Inventors: Eyal Yaakob Levi, Tirat Hacarmel (IL); Ran Ginat, Tirat Hacarmel (IL); Ofer Bruce David, Tirat Hacarmel (IL)

(73) Assignee: BRIGHTWAY VISION LTD, Tirat Hacarmel (IL)

( * ) Notice: Subject to any disclaimer, the term of this patent is extended or adjusted under 35 U.S.C. 154(b) by 0 days.

(21) Appl. No.: 18/071,222

(22) Filed: Nov. 29, 2022

(65) Prior Publication Data

US 2023/0107281 A1 Apr. 6, 2023

Related U.S. Application Data

(63) Continuation of application No. PCT/IB2021/057321, filed on Aug. 9, 2021.

(51) Int. Cl.
*B60Q 1/14* (2006.01)
(52) U.S. Cl.
CPC ........ *B60Q 1/1423* (2013.01); *B60Q 2300/42* (2013.01)
(58) Field of Classification Search
CPC ............................ B60Q 1/1423; F21S 41/153
See application file for complete search history.

(56) References Cited

U.S. PATENT DOCUMENTS

| 2004/0252516 | A1 | 12/2004 | Brun et al. |
| 2006/0146552 | A1 | 7/2006 | Shaffer |
| 2007/0211484 | A1 | 9/2007 | Marchal |
| 2017/0234976 | A1 | 8/2017 | Grauer et al. |
| 2018/0255622 | A1 | 9/2018 | Spero |
| 2019/0126812 | A1 | 5/2019 | Harada |

FOREIGN PATENT DOCUMENTS

| EP | 2653346 A1 | 10/2013 |
| WO | 2004106112 A1 | 12/2004 |

OTHER PUBLICATIONS

First Israeli Office Action & Search Report for Israeli Patent Application No. IL276666 P10534-IL, dated Nov. 19, 2020, 12pp.

(Continued)

*Primary Examiner* — Robert J May
(74) *Attorney, Agent, or Firm* — The Roy Gross Law Firm, LLC; Roy Gross

(57) ABSTRACT

Embodiments pertain to a method for controlling the operation of lighting, the method comprising: actively illuminating a scene with pulsed light generated by at least one pulsed light source of a platform for generating reflections from the scene; gating in timed coordination with the active illumination of the scene, at least one of a plurality of pixel elements of at least one image sensor of the platform; receiving, at least some of the reflections from the scene; generating, reflection-based image data; and controlling, based on the reflection-based image data, the operation of platform lighting comprising a plurality of light sources that are configured in a matrix arrangement for simultaneously subjecting at least one first scene region and at least one second scene region with different illumination power.

20 Claims, 12 Drawing Sheets

(56) References Cited

OTHER PUBLICATIONS

Hella Tech World, "Headlight Adjustment," Retrieved from https://www.hella.com/techworld/au/Technical/Automotive-lighting/Headlight-adjustment-835/, Aug. 30, 2020, 11 pages. Website last visited on Aug. 30, 2020.

PCT International Search Report & Written Opinion for International Application No. PCT/IB2021/057321, dated Nov. 15, 2021, 11pp.

Arrivealive.co.za, "Lighting, Head Lamps and Spot Lights on Vehicles and Rules of the Road," retrieved from https://www.arrivealive.co.za/Lighting-Head-Lamps-and-Spot-Lights-on-Vehicles-and-Rules-of-the-Road on Aug. 19, 2020, 5 pages. Website last visited on Aug. 19, 2020.

"Toyota Corolla Repair Manual," retrieved from http://www.tcorolla.net/adjustment-1323.html on Aug. 19, 2020, 3 pages. Website last visited on Aug. 19, 2020.

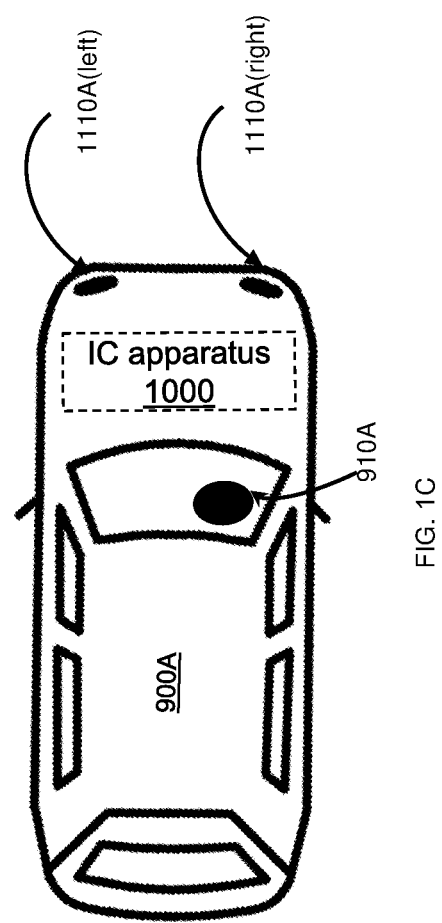

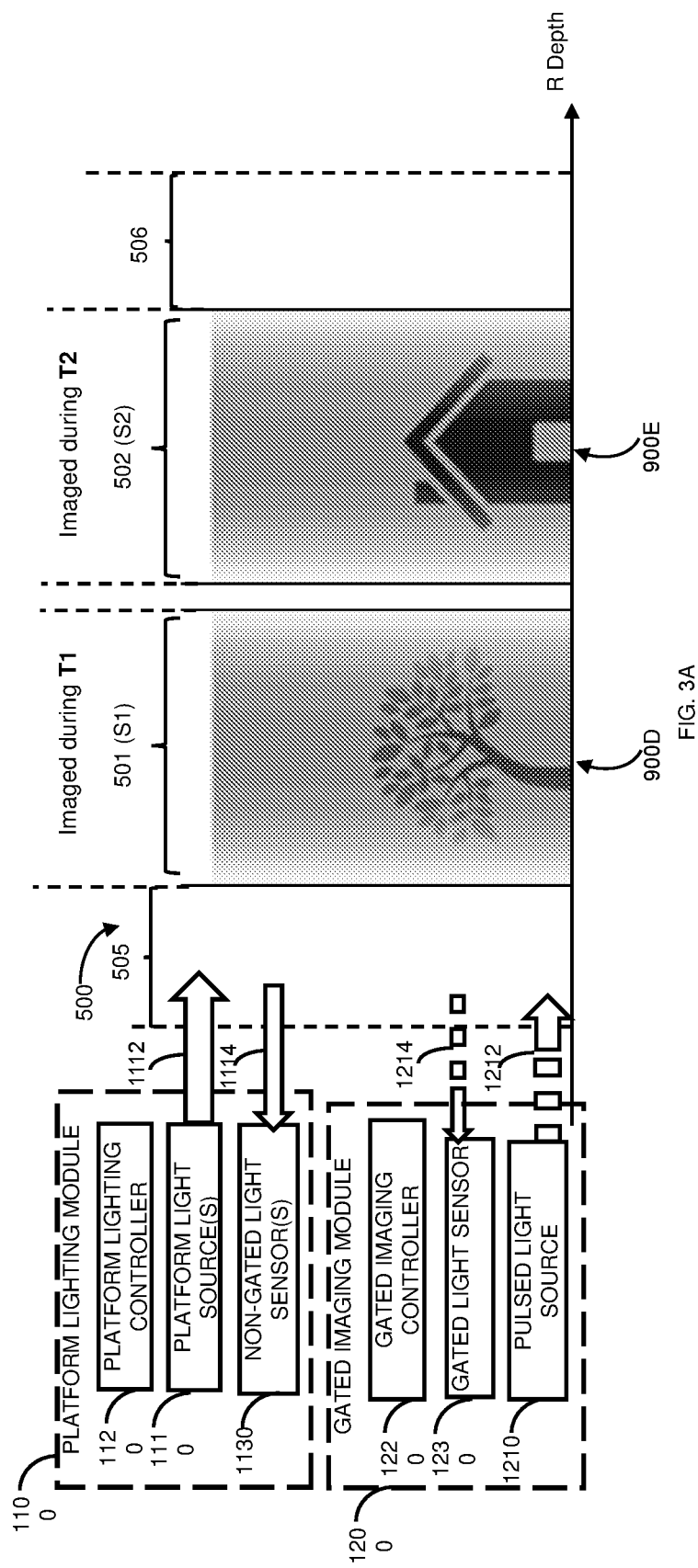

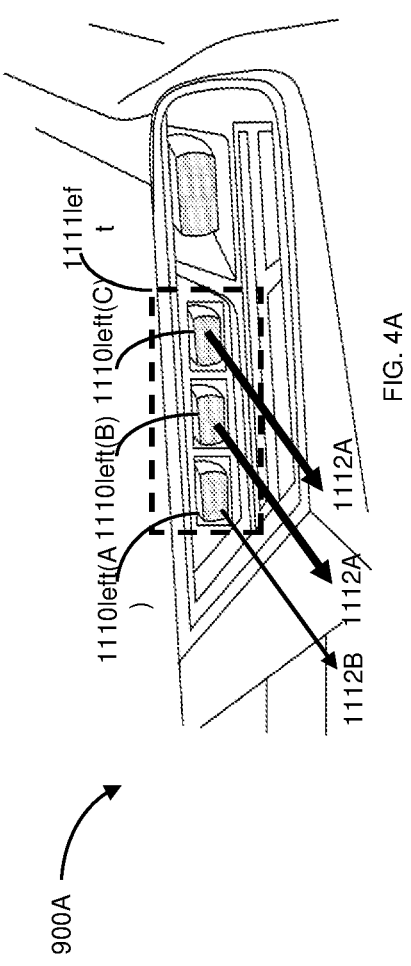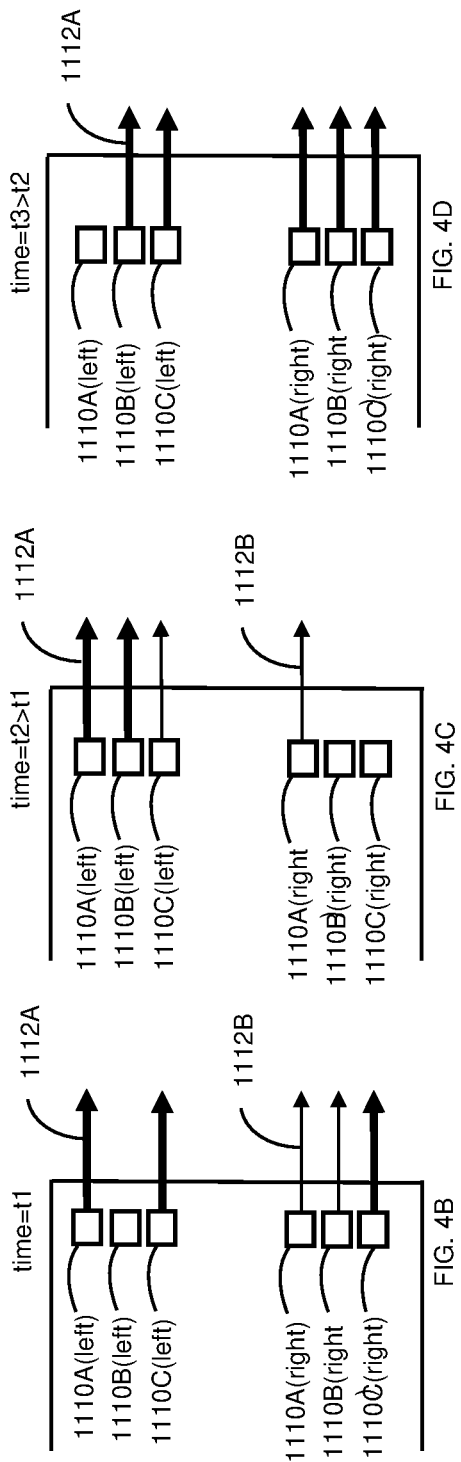

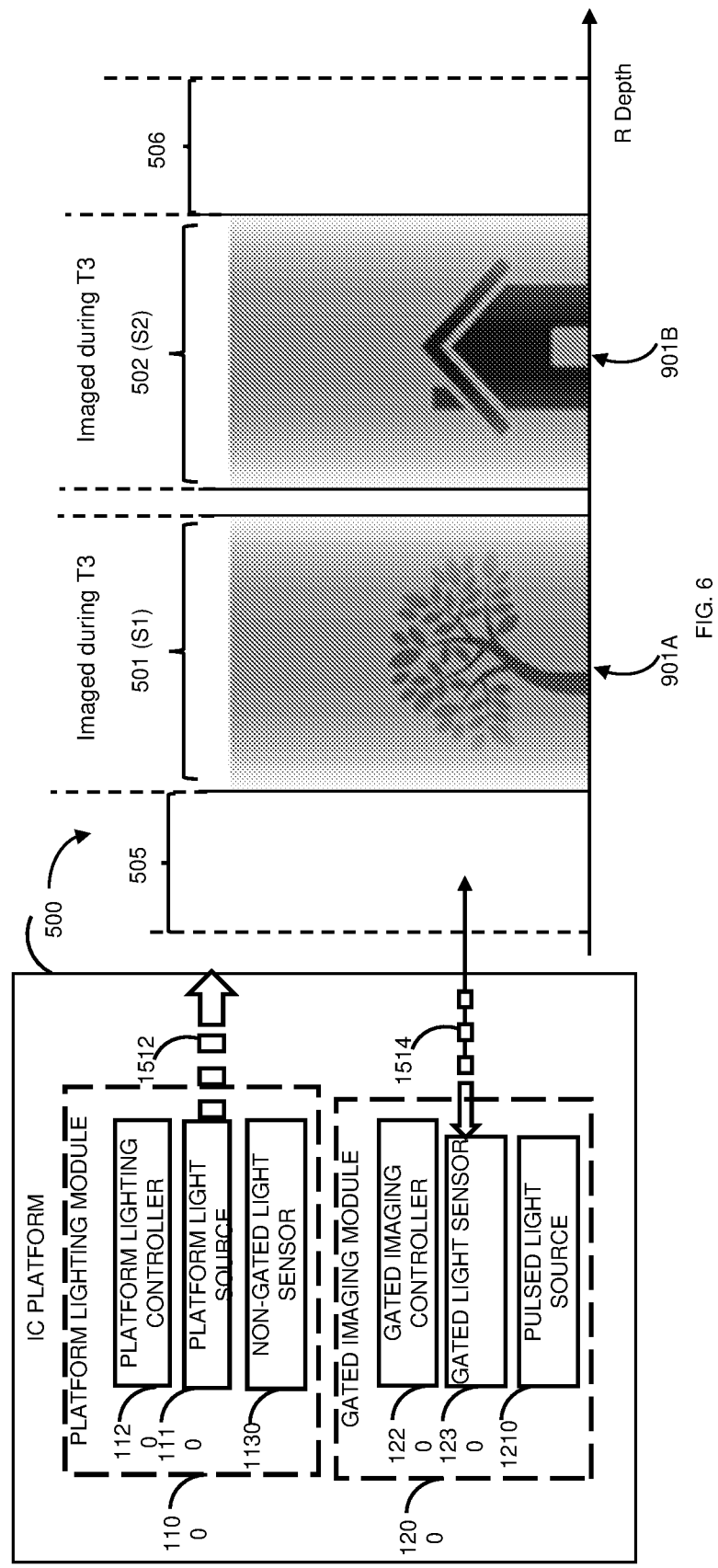

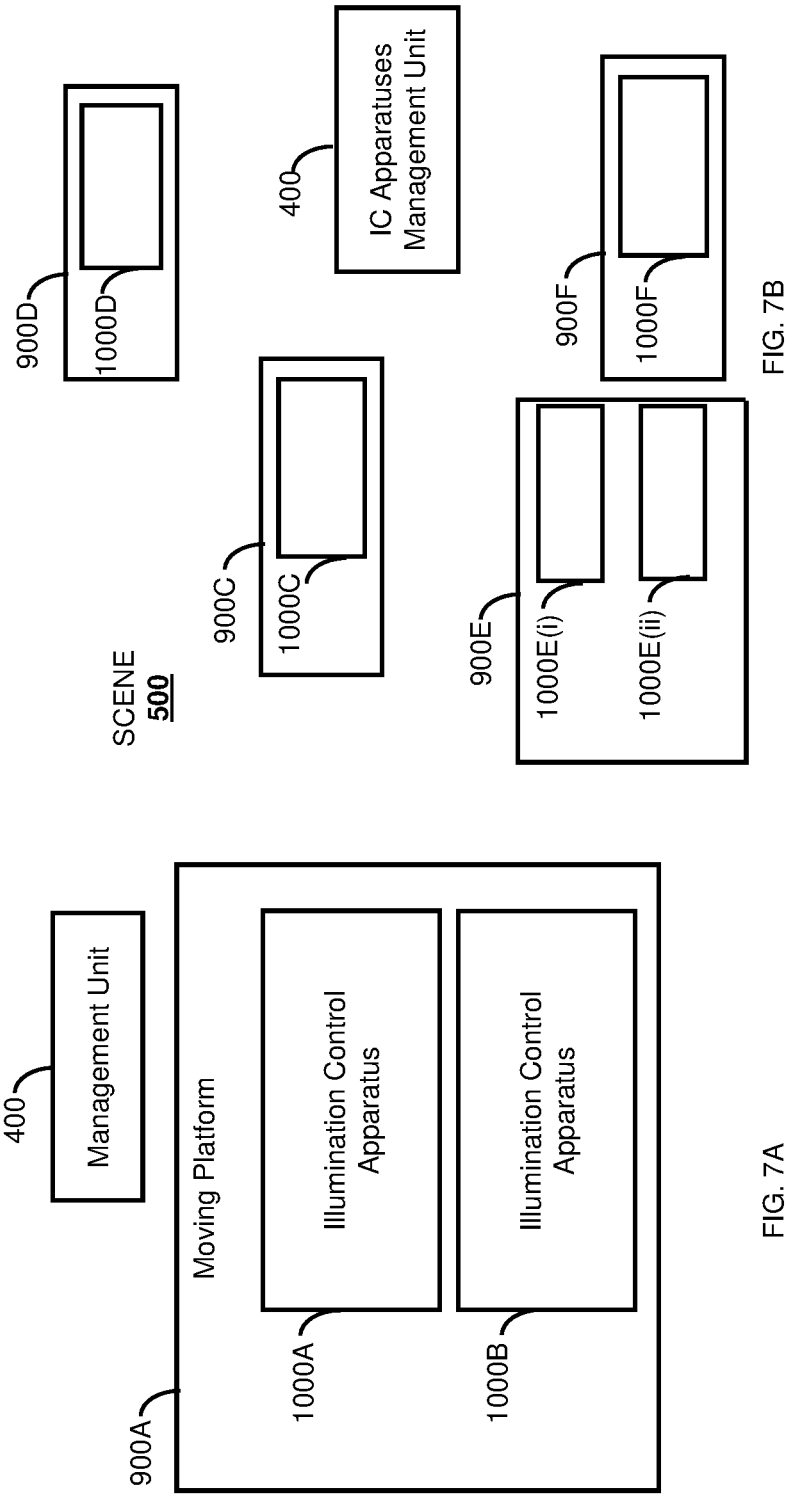

APPARATUS, SYSTEM AND METHOD FOR CONTROLLING LIGHTING USING GATED IMAGING

CROSS REFERENCE TO RELATED APPLICATIONS

This application is a Bypass Continuation of PCT Patent Application No. PCT/IB2021/057321 having International filing date of Aug. 9, 2021, which claims the benefit of priority of Israeli Patent Application No. 276666 filed Aug. 11, 2020, the contents of which are all incorporated herein by reference in their entirety.

TECHNICAL FIELD

The present disclosure relates in general to apparatuses, systems and methods for automatically controlling lighting of a platforms

BACKGROUND

In recent years, adaptive vehicle lighting has been developed that can vary a light distribution pattern and/or angle relative to a travel direction of a motorized vehicle to maintain a high visibility in accordance with a traffic situation such as an oncoming vehicle, a forward travelling vehicle and/or the like, while avoiding glaring (also: blinding) of one or more vision systems of the oncoming vehicle and/or of other objects which may be present in the vehicle's surroundings.

Adaptive vehicle lighting may for instance employ swivel mechanisms for changing an (e.g., swivel angle) of headlamps; light sources (also: illuminants or vehicle light sources) that are arranged in a matrix and which are selectively operable to obtain a desired light distribution pattern and/or intensity; or actuatable attenuation filters installed in front of vehicle lighting.

The following reference may be considered relevant as background to the presently disclosed subject matter:
[1] US2006/0146552

The description above is presented as a general overview of related art in this field and should not be construed as an admission that any of the information it contains constitutes prior art against the present patent application.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 1C is a schematic top view illustration of a moving platform comprising a platform lighting control apparatus

FIG. 3A is a schematic illustration of the gated imaging of objects in a scene in two different time periods, according to some embodiments;

FIG. 4A is a schematic front view illustration of a matrix lighting arrangement, according to some embodiments;

FIGS. 4B-4D are schematic illustrations of moving platform lighting illumination patterns, according to some embodiments;

FIG. 6 is a schematic illustration of gated imaging of a scene with moving platform lighting, according to some embodiments;

FIG. 7A is a schematic block diagram illustration of a moving platform employing a plurality of platform lighting control apparatuses, according to some embodiments;

FIG. 7B is a schematic illustration of a plurality of moving platforms located in a geographic area, the plurality of moving platforms employing one or more platform lighting apparatuses that are managed by an apparatuses management unit, according to some embodiments;

DETAILED DESCRIPTION

Figure 1A:
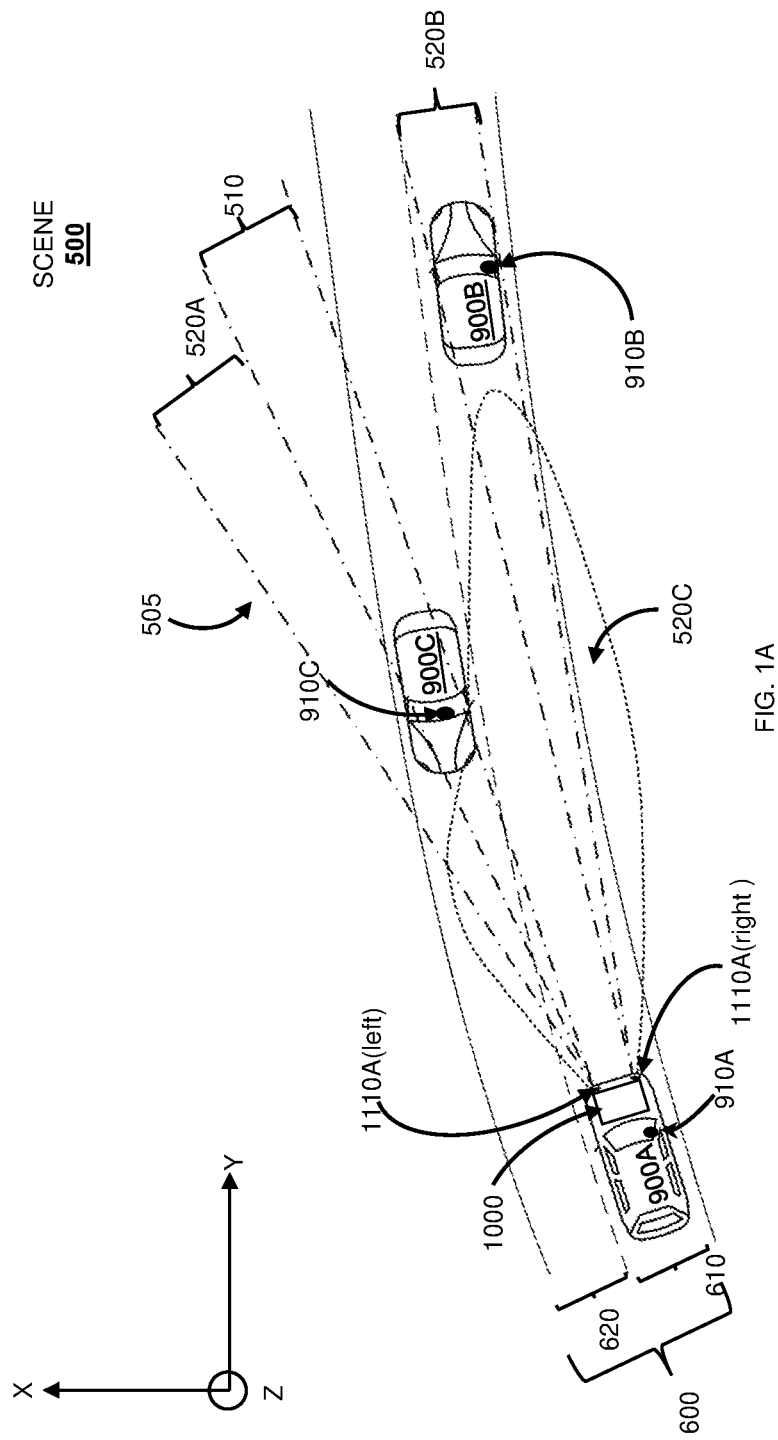
FIG. 1A is a schematic bird's eye view of a moving platform traffic lighting scenario seen from above, according to some embodiments.

The following description of illumination Control apparatuses, systems and methods for automatically and adaptively controlling the operation of lighting of a moving or stationary platform, the lighting comprising light sources that are operable to emit light (also: "broad-spectrum light", "BS light") is given with reference to particular examples, with the understanding that such apparatuses, systems and methods are not limited to these examples. Broad-spectrum light may include but it is not necessarily limited to light of the visible spectrum. Although embodiments may herein be described with respect to moving platforms, this should by no means be construed in a limiting manner. Accordingly, embodiments disclosed herein may also be applicable with respect to stationary or non-movable platforms including, for example, surveillance systems for illuminating the perimeter of an area of interest (e.g., an airfield), or an (e.g., temporarily) stationary platform which can also be in movement.

It is noted that the terms "moving platform" and "movable platform" may herein be used interchangeably. A moving platform which, for the sake of brevity, may sometimes simply be referred to as "platform" may comprise, for example, a vehicle.

In some embodiments, movable platforms lighting is adaptively controlled/controllable based on (e.g., pulsed) reflection-based image data obtained from one or more image sensors responsive to actively illuminating a scene with pulsed light emitted by the illumination Control apparatus to generate reflected light. In some examples, reflection-based image data is generated by accumulating pulsed reflections which are obtained responsive to illuminating a scene with pulsed light.

Reflection-based image data may be descriptive of a scene and generated at least partially by detecting reflections obtained responsive to illuminating the scene with pulsed light. These reflections may be detected at a distance from the platform lighting which extends beyond a scene illumination range of the platform lighting and/or which extends beyond a range corresponding to the visual acuity of a normal human visual system.

Reflection-based image data may be descriptive of scene regions imaged, at least partially, by accumulating pulsed reflections. The visual acuity of a normal human visual system may be considered one with 6/6 or 20/20 vision. Reflections obtained responsive to illuminating a scene with pulsed light may herein also be referred to as "pulsed reflections", although the reflections do not necessarily have to be "pulsed".

Actively illuminating a scene with pulsed light for implementing active imaging applications may for example allow the detection of objects that do not have a thermal signature and/or which are in thermal equilibrium with their surroundings.

As will be outlined further below in more detail, information pertaining to reflected light is used for controlling movable platform lighting to maintain or to provide comparatively improved scene visibility to a user and/or an imaging system to overcome possible shortcomings of the human visual system and/or of the imaging system. The movable platform lighting may be controlled, for example, in accordance with a traffic situation such as an oncoming platform, a forward travelling platform and/or the like, while avoiding glaring (also: blinding) of one or more vision systems of the oncoming platform and/or of other objects which may be present in the platform's surroundings.

A moving platform may include, for example, two-wheeled moving platforms, four-wheeled moving platforms, land-based moving platforms including, for instance, a passenger car, a motorcycle, a bicycle, a transport vehicle (e.g., a bus, truck, a rail-based transport vehicle such as a train, a subway, a tram, etc.), a watercraft; a robot, a pedestrian wearing gear incorporating a gated imaging apparatus; a submarine; a multipurpose moving platform such as a hovercraft, and/or the like. Optionally, a moving platform may be a fully autonomously controllable (e.g., drivable or otherwise traversable) platform (for example a self-driving car, a robotic platform) and/or a partially autonomously controllable platform. The moving platform may traverse a surface in various ways including, for example, in a driving, walking, crawling manner, etc.

In some embodiments, a system comprises a plurality of illumination Control apparatuses that are employed by at least two movable platforms located in a geographic area. Light sources of movable platforms may herein be also referred to as "movable platform light sources".

An illumination range of pulsed light may be about equal or greater than an illumination range attainable when illuminating a scene with platform light. For example, an illumination range of pulsed light may be greater than a platform light illumination range by a factor of, for example, of 1.1 and up to 10 and any value therebetween, or by a factor of at least 10.

In some embodiments, active imaging applications may include, for example, gated imaging, for generating image data descriptive of one or more depth-of-field (DOF) ranges of the scene.

A DOF in a scene may be defined by the DOF's range, which extends from a minimum range $R_{min}$ (also: proximal boundary) to a maximum range $R_{max}$ (also: distal boundary) as measured from a positional reference in the scene (e.g., as measured from an image sensor and/or an illumination source). Otherwise stated, a DOF of a scene can be defined as the distance covered from a proximal to a distal boundary of an imaged range of the scene, as measured from a positional reference located in the scene.

Scene information of a DOF may be attained by performing convolution between a function describing the pulsed light and a function describing the pixel exposure (or sub-exposure) of the image sensor. DOF scene information may be obtained, for example, as disclosed in International Patent Application PCT/IB2016/057853 (filed on 21 Dec. 2016), and which is incorporated herein by reference in its entirety. Optionally, the distance of a proximal boundary of a DOF may be greater than the illumination range of platform light, e.g., by a factor of for example, 1.1 and up to 10 and any value therebetween, or greater by a factor of at least 10.

Optionally, platform light emitted by low beam headlights or other platform lighting configured to be non-glaring or non-dazzling may have an illumination range of, for example, up to 50 meters or 60 meters. Optionally, high beam headlights may have an illumination range of, for example, 120 meters to 500 meters, or 150 meters to 500 meters. Optionally, platform light emitted by low beam headlights, high beam headlights and/or other platform lighting may, if not controlled by the illumination control apparatus, glare other vision systems. Otherwise stated, the illumination control apparatus may be configured and operably coupled with platform lighting to prevent glaring or overexposure of other vision systems.

The term "vision system" as used herein may include, for example, the human visual system), and/or electronic image sensors. Accordingly, a vision system may pertain to an occupant of a platform and/or to a system comprised in the platform. Merely to simplify the discussion that follows, without be construed as limiting, the expression "glaring a human visual system" may herein be exemplified by "glaring a platform occupant", "glaring a driver", "glaring a pedestrian", cyclists, and/or other traffic participants.

Optionally, pulsed light may have an illumination range of, for example, at least 600 meters.

To simplify the discussion that follows, the term "platform light" may herein also be considered to encompass the meaning of the term "platform light source(s)". correspondingly, the term "pulsed light" may herein also be considered to encompass the meaning of the term "pulsed light source(s)".

In some embodiments, characteristics of pulsed light may be adaptively and automatically controlled, e.g., based on information received at the illumination control apparatus. For example, cone geometry and/or a direction/orientation and/or spatial position of the output of pulsed light may be controlled. In some embodiments, the orientation of pulsed light and/or spatial position of the origin thereof may be controlled. In some embodiments, the orientation and/or position of pulsed light emission may be controlled relative to the platform's coordinates system. In some embodiments, the orientation and/or position of pulsed light emission may be controlled relative to the world coordinates. Control of pulsed light and/or pulsed light sources may occur without necessarily requiring taking into accounting the blinding of other vision systems (e.g., the human eye) in the scene. Optionally, the direction/orientation and/or spatial position of pulsed light emission may be controlled while considering the position of other vision system to avoid blinding thereof. Optionally, a pulsed light inclination can be selectively controlled relative to the horizon without necessarily requiring taking into accounting the blinding of other vision systems (e.g., the human eye). Optionally, the inclination of pulsed light may be controlled while considering the position of other vision system to avoid blinding thereof. Optionally, pulsed light may be emitted at an angle that can exceed or be above the horizon as, for example, observable from the positions of the pulsed light sources. In other words, the optical axis of the pulsed light may have a cone or tilt span having a range of, for example, +/−30 degrees; and extend laterally or have a yaw span ranging, for example, from +30 degrees to −30 degrees, e.g., all with respect to a reference world coordinate system or with respect to the moving platform coordinate system. Optionally, the angle of illumination of pulsed light may be 0.5-30 degrees above and/or below the horizon. In this way, an object that surpasses and/or that is below the horizon may be actively illuminated by pulsed light. For example, an angle of −20 degrees to −30 degrees may be employed to illuminate the road for determining road conditions.

Optionally, some pulsed light characteristics may remain constant and/or controlled manually.

Similarly, characteristics of moving platform lighting may be adaptively and automatically controlled based on information received at the illumination control apparatus.

In some embodiments, the light cone and/or a direction and/or spatial position and/or other characteristics of the output of platform light may be controlled. In some embodiments, the direction of platform light output and/or spatial position of the origin thereof may be controlled. In some embodiments, the orientation and/or position of platform light emission may be controlled relative to the platform's coordinates system. In some embodiments, the orientation and/or position of platform light emission may be controlled relative to the world coordinates. In some examples, pixels of moving platform light may be selectively lit on or turned off.

Optionally, some moving platform light characteristics may remain constant and/or controlled manually.

In some embodiments, an angle between the optical axes of the pulsed and the platform light may be adaptively controllable, for example, to compensate or complementary illuminate with pulsed light a region that is not or insufficiently illuminated by platform light, e.g., due to inclination of the latter.

In some embodiments, an angle between the optical axes of the pulsed light and the platform light may be adaptively controllable, for example, to compensate or complementary illuminate with the platform light a region that is not or insufficiently illuminated by pulsed light, e.g., due to inclination of the latter. For example, a platform light inclination angle for actively illuminating the scene can be adjusted to be above a pulsed light inclination angle to compensate for therefor. In some embodiments, direction and/or spatial origin of platform lighting output may be adapted to avoid the blinding of vision systems, and pulsed light emission may be controlled accordingly to compensate for the adaptation of the platform light emission.

In some embodiments, output power and/or other operating parameter values of pulsed light may be adjusted based on, for example, the output power of platform light to increase visibility of the scene based on reflections received responsive to illuminating the scene with pulsed light.

Optionally, the (e.g., pulsed) reflection-based image data received responsive to actively illuminating the scene with pulsed light is descriptive of a scene range that extends beyond or is farther away from a platform than a scene range illuminated by the platform lighting.

It is noted that the term "visibility condition" as used herein may refer to the ability of a vision system to identify objects in a scene to safely navigate a platform along a desired travel direction.

By providing a platform light control loop which controls the operation of platform lighting (glaring or non-glaring) based on image data that is descriptive of reflected pulsed light, instead of or in addition to controlling the operation of the platform lighting responsive to analyzing reflected platform light (also: non-visible spectrum image data), may facilitate faster control loop convergence, facilitate the controlled operation of platform lighting to better adapt to changing driving conditions, reduce feedback latency, provide more accurate control feedback that can be input into controllers, reduce time periods for operating otherwise glaring platform light, and/or the like. Optionally, operation of moving platform light may be controlled to prevent glaring due retroreflection. Optionally, the apparatus may be operable to identify the presence of retroreflecting surfaces and control the operation of pulsed and/or moving platform light accordingly to avoid (self-)glaring.

A platform comprising or employing an Illumination Control (or: IC) apparatus may herein be referred to as illumination controlling or IC platform.

The term "adaptive" as used herein as well as grammatical variations thereof refers to the capability of, e.g., a system, apparatus, device, element, module and/or unit to automatically change, modify and/or alter an operational characteristic value thereof in response to a change of, e.g., a driving condition.

The term "Dynamic" concerns control through forcefully changing operational characteristics of, e.g., a system, apparatus, device, element module and/or unit, e.g., according to a predetermined protocol or sequence.

Embodiments and examples described in the discussion that follows can, in principle, be implemented in conjunction with any moving or movable platform and does not necessarily have to be limited to vehicular implementations, unless where explicitly stated otherwise. Merely to simplify the discussion that follows, without to be construed in a limiting manner, embodiments and examples may be discussed herein with respect to motorized and non-motorized platforms or other vehicular platforms. Optionally, a moving platform may be embodied by a helmet mounted display (HMD) and/or any other wearable device.

Optionally, components, elements, features, engines and/or modules (herein collectively referred to as "components") of a illumination Control apparatus may be implemented by a multifunction mobile communication device (also: smartphone) which may be mountable, for example, on a platform's dashboard. In a further example, light sources (e.g., pulsed light sources and/or platform light sources) and image sensors of a illumination Control apparatus may be integrated with or mounted on the frame of a pair of glasses that is configured to overlay (e.g., gated) imaging information coaxially (including substantially coaxially) with the field-of-view (FOV) of the glasses' wearer. In yet further examples, only some components of a illumination Control apparatus may be comprised in a multifunction mobile communication device and/or in a wearable device.

Optionally, the illumination control apparatus may be integrated or configured to be integratable with existing Enhanced Driver Visions Systems (EDVS), e.g., to provide visual feedback.

A scene or regions of the platform's surroundings may be adaptively illuminated and/or imaged with pulsed- and/or platform light in accordance with or based on characteristics pertaining to a current and/or expected traversing (e.g., driving) condition. An expected driving condition may refer to a determined estimate of a future driving condition. Imaging a scene may optionally include acquiring and tracking one or more objects located in the scene.

A driving condition may refer to a traffic situation including object detection including determining the presence or non-presence of pedestrians, animals, and/or other platforms in the IC platform's surrounding. Object identification may identify platforms, for example, as rescue platforms, passenger cars, motorcycles; streetcars; cyclists, etc. Pedestrians may for example be identified as adult or child; and inanimate objects may for example be identified as roadside guide posts; bricks; train tracks; elevations; streetcar tracks; street bumpers; pits; sidewalks; construction sites; pallets; etc.

In some embodiments, pulsed light and/or platform light sources may be controlled based on object characterization, which can include object identification and/or classification. For example, objects in a scene may be classified in accordance with their damage and/or danger potential. For instance, objects in a scene may be classified as "important", "unimportant" with respect to their damage potential to the moving platform or themselves. For example, a cat or other small animal located in the moving platform's driveway may be classified as "unimportant", whereas an object identified as a "child", also located in the platform's driveway, may be classified as "important". Based on the object classification, the illumination control apparatus may cause the moving platform lighting to primarily illuminate the child and its surroundings, and not the small animal. Optionally, a visual and/or audible output may be provided to an occupant of IC platform in response to classifying a situation as potentially dangerous.

In some embodiments, object characterization may comprise associating a distance of the object relative to the moving platform, optionally, taking into consideration the platform's driving direction. For example, the closer the object to the moving platform, the more likely the object may be classified as "important". Optionally, if a short-distance criterion is met, the object may be classified as "important", as opposed to other objects which do not meet the "short-distance criterion". A short-distance criterion may pertain to a distance threshold between the object and the moving platform and below which an object may be classified as "important". A driving condition may also refer to a driving direction of the IC platform and/or of the other platforms located in the IC platform's surrounding, a driving task (e.g., expressway merging, high speed cruising, low speed traffic jam); a driving environment (e.g., urban driving environment, inter-urban driving environment, highway driving environment); level of surface being or to be traversed; platform orientation relative to a road lane; platform elevation and/or orientation relative to a base surface (e.g., platform orientation relative to a base road surface when driving over a speed bumper); height of lighting above road surface; difference in height between components and/or passengers of a first platform relative to a second platform; and/or the like.

A driving condition may further refer, for example, to the purpose of platform (e.g., taxi, private); level of autonomous driving capability, e.g., as defined by the US Department of Transportation's National Highway Traffic Safety Administration (NHTSA) and/or by SAE International; safety features employed by the platform (e.g., number and location airbags); safety rating (e.g., as administrated by Euro NCAP); (instantaneous) platform speed; platform acceleration; acceleration input; platform deceleration; platform weight; platform pitch, azimuth and/or bank angle; number of occupants; platform appurtenances; tire pressure; motor temperature; remainder machine oil; gasoline burn rate; windshield transmittance; transmittance of protective covers for shielding light sources of platform lighting; platform length, height and/or width of the platform; in-platform temperature; in-platform humidity; engine type (e.g., diesel, gasoline, electric, hybrid); type of transmission gear (e.g., manual transmission, automatic transmission); brake system characteristics; braking action characteristics; etc.; conditions of the surface traversed by the platform (e.g., wet, dry, muddy, snowy road, icy road, dusty surface); road width; road surface type (e.g., tarmac, cobbled, pebble stones); scene visibility; a natural and/or manmade geographic characteristic (e.g., platform position-time tuple information, road curvature; road gradient, roadway configurations (e.g., location of intersections) and venues accessed by the roadways, roadways statuses); weather conditions (e.g., temperature, rain, fog, smog, snow, dust, humidity; wind directions; wind velocity); surface (e.g., road conditions), electromagnetic (EM) radiation characteristics; and/or any other characteristic pertaining to the IC platform's surrounding conditions and, for example, as well as that of other platforms.

Optionally, a driving condition may also refer to and/or include intrinsic properties including, for example, service life of a car battery, service life of the light sources of platform lighting, and/or the like.

Data descriptive of driving conditions may be received from onboard-platform sensors and/or systems; and/or from non-onboard platform sensors and/or systems including, for example, sensors employed by other platforms, by smartphones; laptop computers; tablet computers; wearable devices; and/or notebook computers. Data received from the various sensors may be fused for further processing and/or display. For example, image data may be generated and displayed as an image presenting information which pertains to both the IR and visible range. Optionally, data such as image data may be shared with other systems and/or devices (e.g., platforms). In some embodiments, panoramic scene image information may be generated and, optionally, displayed, based on data generated by image sensors employed by the IC platform and/or other systems and/or devices imaging the corresponding scene. In some embodiments, panoramic scene image information may relate to a scene in which IC platform is currently located, and/or to a scene in which IC platform is not currently located. Image data may include rear-view and/or side-view image information. The terms "rear" and "side" are to indicate a direction relative to a current travel direction of the IC platform.

It is noted that while embodiments may herein be described with respect to "forward" illuminating a scene, this should by no means be construed in a limiting manner. It is also noted that while embodiments may herein be described with respect to illuminating a scene in a same direction as a travel direction, this should by no means be construed in a limiting manner.

For example, the at least one pulsed light source and/or platform light source and the at least one image sensor may be arranged and configured such that the reflection-based image data is descriptive of image information of a field-of-view (FOV) extending in a direction which is different from a current direction of travel of the platform in the scene. Optionally, the imaged FOV may extend in a direction (e.g., rearward travel direction) that is opposite the current direction of travel (e.g., forward travel direction) of the IC platform.

Optionally, the at least one pulsed and/or platform light source and the at least one image sensor may be arranged and configured such that the reflection-based image data is descriptive of image information of a FOV extends in a direction which is different from a forward-facing orientation of the IC platform in the scene.

In some embodiments, the onboard platform and/or external sensors and/or systems may be configured to obviate the need of employing rear-view and/or side view mirrors. Optionally, the IC platform may be mirror-free to reduce aerodynamic drag.

Onboard platform and/or external sensors and/or systems may include, for example, global navigation satellite systems (GNSS) such as, for example, the US-operated Global Positioning System (GPS), and the Russian-operated Global Navigation Satellite System (GLONASS); V2X communication; Radars; Ultrasonic sensors; directional microphones; LI DARs; stereo cameras, mono-cameras, passive and/or emission-based imaging systems employing optical flow analysis and/or any other type of imaging, depth mapping and/or ranging technology.

A position-time tuple or position-time-velocity tuple of a platform may be determined by a GNSS and/or determined based on the sensing physical quantities relating to EM radiation characteristics including, for example, received signal strength (RSS), signal time-of-flight, phase difference, and/or the like. Measured values of characteristics may be employed by using trilateration and/or triangulation techniques for estimating the location of a platform. Location estimation may be performed by employing optimization techniques such as, for example, a Non-Linear Model Fit.

Embodiments of the apparatuses, methods and/or systems disclosed herein may be employed, for example, in conjunction with LIDAR(s) and/or other imaging techniques for controlling the operation of platform lighting. For instance, data obtained by such other techniques may also be considered for controlling platform lighting. Information in the visible spectrum may be employed for controlling the operation of other sensing techniques, including LIDAR(s).

The illumination control apparatus may be configured to produce, in principle, "continuous" two-dimensional (2D) and three-dimensional (3D) image data, whereas LIDAR techniques may require traversing the scene for the imaging thereof, for example, to produce a depth map (e.g., (3D) information of an object's shape and/or the object's distance from a reference point, etc., which may be represented, for example, by a 3D point cloud). Hence, the illumination control apparatus may, in some embodiments, complement the operation of, for instance, LIDAR techniques employed by a platform.

Compared to LIDAR and/or other imaging techniques that require scene traversing and/or scanning, the illumination control apparatus and method may be comparatively less costly in terms of time and computational resources required for generating depth data, and may also be configured such that it is less difficult to meet (e.g., automotive) regulatory requirements with gated imaging apparatuses, systems and/or methods.

In some embodiments, a driving condition may initially be determined using a variety of imaging techniques in the non-visible spectrum (e.g., LIDAR, Radar, gated imaging, etc.) and, based on the determined driving condition, illumination control apparatus may adaptively controllably illuminate the scene, e.g., to avoid blinding of objects and/or to better illuminate objects located in the scene.

The non-gated imaging techniques such as LIDAR may be employed to facilitate the illumination control apparatus for 3D ranging an object of interest in the scene. In some other embodiments, non-gated imaging techniques may traverse a scene according to information received from the illumination control apparatus.

Illumination control apparatuses can be comparatively easily installed in a platform (e.g., car). For example, a gated light sensor of illumination control apparatus may be mounted internally in the platform cabin behind the car's windshield, and a pulsed light source may be mounted next to the front platform lighting. In embodiments where the platform light source and/or platform light sensor are installed behind the windshield, then the platform light data generated by the non-gated light sensor can be indicative of the transmittance of the windshield (e.g., amount of dirt accumulated thereon). Analogously, in embodiments where a platform light source and/or a non-gated light sensor are installed behind the protective cover shielding the platform light sources, then the platform light data generated by the non-gated light sensor can be indicative of the transmittance of the light source's protective cover (e.g., amount of dirt accumulated thereon).

While embodiments discussed herein may pertain to situations where the platform employing an apparatus for automatically and adaptively controlling the operation to image to illuminate and/or image a scene is moving to traverse along a certain travel direction, this should by no means be construed in a limiting manner. Accordingly, embodiments discussed herein may also be applicable in situations in which the platform is not in motion. In the latter case, a "travel direction" may thus refer to an orientation of the platform in the scene or of the optical axes of the light sources employed thereby.

In some embodiments, a method for controlling one or more BS light sources of a platform located in the scene, comprises actively and adaptively illuminating the scene with pulsed and/or steady-state pulsed light generated by one or more pulsed light sources for generating scene reflections. The method further includes receiving at least some of the scene reflections on one or more image sensors of the apparatus. Each one of the one or more image sensors comprises a plurality of pixel elements. At least one of the plurality of pixel elements of the one or more image sensors may convert the reflections into pixel values descriptive of reflection-based image data, which may be analyzed for determining a driving condition. The method includes automatically and adaptively controlling, based on the reflection-based image data, the operation of the platform lighting to illuminate the scene with platform light (also: visible broad-spectrum light). Optionally, in case of illuminating the scene with pulsed light, at least one of the plurality of pixel elements may be gated to generate, based on the pixel values of the gated pixel element(s), reflection-based image data. In some examples, reflection-based image data may be processed to obtain depth-of-field (DOF) data descriptive of a depth-of-field range of the scene.

In an embodiment, a plurality of pixel elements of one or more image sensors may be grouped (also: temporal-spatially arranged/controllable) into one or more subsets of pixel elements for producing reflection-based image data that is descriptive of one or more DOF ranges, respective of the one or more pixel subsets. Two or more DOF ranges may differ from each other.

In some embodiments, two different pixel subsets may be activated and deactivated in timed coordination with each other for imaging a corresponding plurality of desired DOFs.

For example, a first pixel subset of one or more image sensors may be employed for imaging a first DOF, and a second pixel subset of the same one or more image sensors may be employed for imaging a second DOF. Optionally, a first subset of pixel elements may have a spatial and/or temporal activation/deactivation pattern that is different from the spatial and/or temporal activation/deactivation pattern of a second subset of pixels or pixel elements.

Additional embodiments pertaining to the imaging of DOFs with different subsets of pixels is disclosed in International Patent Application PCT/IB2016/057853. The image data obtained from the respective subsets of pixels may be used as an input for controlling the illumination control apparatus and/or for implementing the method for platform lighting by the illumination control apparatus.

To simplify the discussion that follows, the term "subset of pixel elements" may herein also be simply referred to as "pixel subset" or "subset", and is used to indicate a selection of at least two pixel elements to form a subset. In an embodiment, a subset may be composed of two or more pixel elements of a certain image sensor. In another embodiment, a subset may comprise of two or more pixel elements shared by at least two image sensors. For example, three pixel elements of a first image sensor and two pixel elements of a second image sensor may together form a subset of pixels or pixel elements.

In an embodiment, at least two pixel elements of one or more image sensors may be independently controllable. Optionally, each pixel element of the one or more image sensors may independently controllable.

In an embodiment, two different pixel subsets of the one or more image sensors may be independently controllable by the controller.

In an embodiment, the two or more respective DOF ranges respective of the two or more subsets of pixel elements may be read out in a single image frame (also: pixel value readout step). A readout frame may be defined as the transfer of signal values from the pixel elements of the gated light sensor(s) to a memory and/or an image processing application(s) for further processing by a processor. In other words, a readout frame is defined as the process of data readout from the array of pixel elements of the gated light sensor, for example, for providing reflection-based image data descriptive of a DOF range of the scene. Optionally, a plurality of readout frames may be employed for imaging the same DOF.

In an embodiment, and as for instance disclosed in International Patent Application PCT/IB2016/057853, various gating profiles may be employed for producing reflection-based image data of a DOF range. Such gating profiles may be expressed by rectangular, trapezoid, triangle, and/or other geometries, or by arbitrary shapes not necessarily having a specific geometry. In other words, a gating profile can assume any practically applicable shape. A gating profile can be expressed as the result of performing convolution between a function describing the pulsed light and a function describing the pixel exposure (or sub-exposure). It is noted that the term "gating profile" can be defined for a given DOF, inter alia, by a pixel exposure profile.

It is noted that, unless otherwise stated and/or the context requires, embodiments described herein are not necessarily limited to the employment of gated imaging for generating reflection-based image data descriptive of a DOF range of the scene.

The term "broad-spectrum light" as used herein may, for example, refer to electromagnetic radiation extending across a spectrum which can, for example, include wavelength components of the visible and the IR spectrum, without being centered about a predominant wavelength. Merely to simplify the discussion that follows, without be construed limiting in any way, broad-spectrum light may herein be considered to comprise "visible light", "visible-spectrum light", "light of the visible spectrum". Optionally, light having a spectral width 180 nm may be referred to as broad-spectrum light.

In some embodiments, pulsed light may comprise pulsed "narrow-spectrum" light. The term "narrow-spectrum light" as used herein may, for example, refer to electromagnetic radiation that is centered about a predominant wavelength. Narrow-spectrum light may, for example, include wavelength components of the visible spectrum and the IR spectrum. Optionally, light having a spectral width <180 nm may herein be referred to as narrow-spectrum light. IR light may encompass the near-infrared (NIR), short-wavelength IR (SWIR), mid-wavelength IR (MWIR), long-wavelength IR (LWIR) and/or the far-infrared (FIR) spectrum.

Some of the platform's lighting may include a matrix lighting arrangement (also: matrix lighting) that employs a plurality of selectively controllable light sources for adaptively illuminating the scene in accordance with values relating to characteristics of a current and/or expected driving condition. For instance, a scene may be illuminated by the platform light such to avoid glaring of objects (e.g., drivers of oncoming platforms) located in the platform's surroundings.

Some known adaptive platform lighting may detect the presence of other objects (e.g., platforms) in the scene more efficiently when the scene is actively illuminated by visible spectrum light. However, actively illuminating the scene using visible spectrum light may, in turn, glare vision systems (e.g., drivers of oncoming platform(s), pedestrians) and/or image sensors).

It may be considered to be an object of apparatuses, systems and methods presented herein to provide improved automatically controllable adaptive platform lighting and/or active illumination of the scene with pulsed light, e.g., to improve scene visibility and/or to produce improved image information.

Platform lighting and/or the light sources employed thereby that may be operably coupled with or comprised in the apparatus may include, for example, dipped beam light sources (e.g., for low beams, passing beams, meeting beams), main beam light sources (e.g., high beam, driving beam, full beams); driving lamps, front fog lamps, daytime and/or nighttime conspicuity light sources, cornering lamps; front position lamps; rear position lamps; brake lights; rear fog lamps; and/or reversing lamps. The platform lighting may employ a variety of lighting technologies including, for example, incandescent lamps (e.g., halogen), electrical gas-discharge lamps (e.g., high-intensity discharge lamps or HID); light emitting diodes (LED), phosphor-based light sources (e.g., Laser Activated Remote Phosphor technology) and/or the like. Optionally, platform light sources that are in a matrix arrangement may be a continuous wave having a constant intensity (encompassing also a substantially constant intensity) or a modulated/modulatable intensity. Optionally, platform light sources that are configured in a matrix arrangement may be pulsed.

It follows from the aforesaid that while certain embodiments may, for example, be described with respect to the operation of light sources for forward illumination (e.g., headlamps), this should by no means to be construed in a limiting manner. Accordingly, such embodiments may analogously be applicable in conjunction with other types of, e.g., platform lighting including, for example, lateral and/or rearward lighting.

In the description that follows, the terms "forward" and "backward" refer to directions that can normally be considered to be a forward and backward travel direction of the respective platform.

Figure 1B:
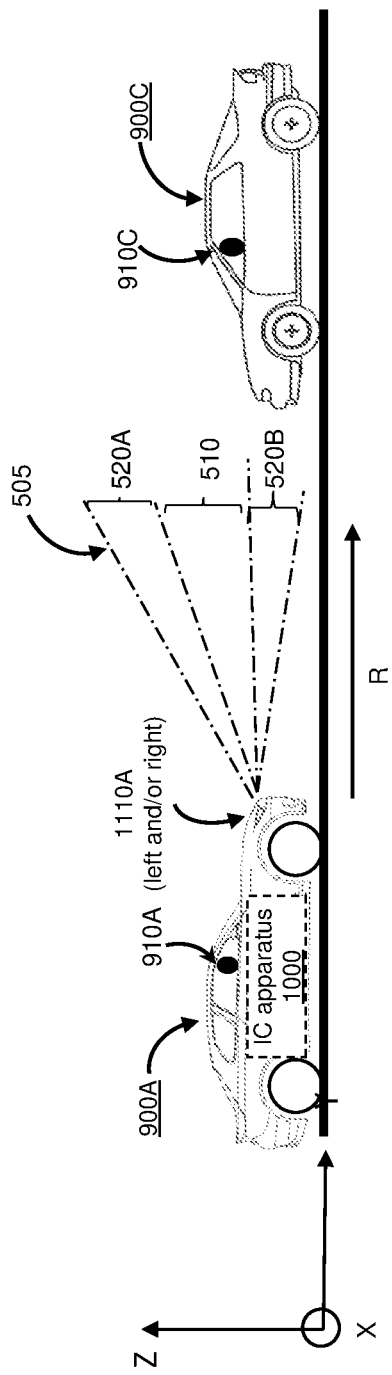
FIG. 1B is a schematic side view illustration of a moving platform traffic lighting scenario, according to some embodiments.

Referring now to FIGS. 1A-1C and FIG. 2, first platform 900A may in some embodiments employ a platform lighting control (VLC) apparatus 1000 that is configured to automatically control the operation of one or more platform light sources 1110 of first platform 900A, e.g., for selectively illuminating a scene 500 in a travel direction thereof. VLC apparatus 1000 may be operable to selectively illuminate scene 500 in an x-y plane, e.g., of the world coordinates (FIG. 1A) and/or in the x-z plane, e.g., of the world coordinates (FIG. 1B). Otherwise stated, a plurality of scene regions definable or spanned by the x-y world coordinates may be controllably illuminated and/or a plurality of scene regions definable or spanned by x-z coordinates may be controllably illuminated by VLC apparatus 1000. Hence, platform light sources 1110 may be selectively controlled by VLC apparatus 1000 to generate varying azimuth and/or height-related scene illumination patterns.

In some embodiments, an orientation (pitch, roll and/or azimuth) of platform light source 1110 may be controlled. In some embodiments, the pitch and/or azimuth of platform light emitted by the platform light sources 1110 may be controlled. In some embodiments, the orientation may be controlled relative to the platform's coordinates system. In some embodiments, pitch, roll and/or may be controlled relative to the world coordinates. In some embodiments, the shape of a light cone produced by the one or more light sources 1110 may be controlled.

The one or more platform light sources 1110 of IC platform 900A may herein be exemplified as forward illuminating headlamps 1110A(left) and 1110A(right) and, merely to simplify the discussion that follows without be construed in a limiting manner, some times in the singular as "platform light source". Optionally, first platform 900A employing illumination control apparatus 1000 may herein also be referred to as a "IC platform". Optionally, first platform 900A may herein be referred to as "hosting" IC apparatus 1000 or parts thereof. For instance, a platform lighting module (also: broad spectrum illumination module) 1100 may be pre-installed in first platform 900A, and later retrofitted with a gated imaging module 1200, for example, for adaptively controlling platform lighting module 1100, e.g., as outlined herein. Optionally, gated imaging module 1200 may be later installed and may be controlled according to the input provided by platform lighting module 1100. Either way, IC platform 900A may herein in correspondence thereto also be referred to as "host platform 900A".

In some embodiments, platform lighting module 1100 or platform light sources 1110 may be comprised in illumination control apparatus 1000. In some other embodiments, platform lighting module 1100 or platform light sources 1110 may be operably coupled with illumination control apparatus 1000 but not constitute a part of illumination control apparatus 1000. Optionally, a platform may be retrofitted with one or more components of illumination control apparatus 1000. For instance, platform lighting module 1100 may be retrofitted with Illumination control apparatus 1000. Optionally, one or more components of illumination control apparatus 1000 may be pre-installed in IC platform 900A.

However, merely to simplify the discussion that follows, without to be construed in a limiting manner, illumination control apparatus 1000 is in the accompanying figures illustrated as comprising platform light sources 1110.

Either way, platform light sources 1110 may be controllable to allow illuminating scene 500 with a varying light distribution pattern that may be adapted by illumination control apparatus 1000 to a momentary and/or expected driving condition pertaining to IC platform 900A.

A light distribution pattern may be changed by adaptively altering, for example, values of platform light characteristics relating to, e.g., a scene or target illumination intensity, illumination depth, an illumination angle (also: spread angle), a color tone, polarization, and/or an illumination direction of emitted platform light (also: optical axis thereof) relative to a reference direction such as, for example, travel direction of IC platform 900A.

It is noted that the term "scene illumination intensity" as used herein pertains to the illumination intensity as obtained in the scene, e.g., the illuminance or luminous flux that may be incident on an object surface located in the scene remotely or at a certain distance from the platform's light source(s). The illumination intensity may for example be the amount of light or luminous flux incident on a road per unit area, the light originating from the light sources of a platform and, optionally, of other sources of light that may be located in the scene.

In the momentary situation schematically shown and exemplified in FIG. 1A, the surroundings of IC platform 900A include two other platforms, second and third platforms 900B and 900C, of which second platform 900B is illustrated to drive on a same lane 610 and in the same travel direction as IC platform 900A, while third platform 900C is driving on a neighboring lane 620 of road 600 towards IC platform 900A. A vision system (e.g., driver, a camera system) of first or IC platform 900A is herein designated by reference numeral "910A", and second and third vision systems (of respective second and third platforms 900B and 900C) are herein designated by reference numerals "910B" and "910C", respectively.

In order to distinguish between each of the platforms, capital alphabetic characters are added after the numerals. However, when there is no need to particularly distinguish each of the objects, they may simply and collectively referred to as "platforms 900".

Illumination control apparatus 1000 automatically and adaptively controls the operation of broad-spectrum (BS) light sources 1110 (e.g., platform light source 1110(left) and platform light source 1110(right) employed by IC platform 900A such to avoid blinding of second and third vision systems 910B and 910C of second and third platforms 900B and 900C while, at the same time, illuminating scene regions 505 between and/or alongside these objects with bright platform light to maintain visibility and/or to obtain sufficient reflected platform light (also: broad-spectrum reflections or broad- and visible spectrum reflections) 1114. One or more selected scene regions may thus not be illuminated or the light for illuminating one or more selected scene regions may dimmed, to avoid blinding of objects, while other scene regions may be illuminated at comparatively higher output illumination power.

A scene region that is dimly illuminated may herein be referred to as "dimmed scene region" 510, while other selected regions of scene 500 that are illuminated at higher output power by platform light sources 1110 to maintain a high visibility are herein referred to as "bright scene region(s) 520" (exemplified in FIGS. 1A and 1B as first and second bright scene regions 520A and 520B. Optionally, the platform light sources' output power may be adjusted by employing, for example, shutters, filters and/or the like. Optionally, dimmed scene region 510 may not be actively illuminated at all by platform light sources 1110 or illuminated thereby with "dimmed" platform light having a luminous intensity that is comparatively lower than that of "bright" platform light employed for illuminating bright scene region 520. For example, illumination control apparatus 1000 may adaptively and automatically control the operation of platform light sources 1110 such that second vision system 910B is not being blinded when looking towards the rearview mirror (not shown) and/or such that third vision system 910C of oncoming third platform 900C is not being blinded by light emitted from platform light sources 1110 of IC platform 900A.

Optionally, platform light sources 1110 may be operated to illuminate a scene region having non-conically shaped boundaries. Such scene region is exemplified in FIG. 1A by bright scene region 520C confining a region of unspecified or arbitrary geometry controllably generated to adaptively provide a scene illumination pattern, e.g., to avoid blinding of oncoming objects.

Optionally, illumination of scene 500 may be adaptively controlled to intentionally illuminate certain objects within a certain DOF range to increase their visibility (e.g., illuminate road obstacles by employing a highlighting spotlight or platform high beam with a comparatively narrow Field-of-illumination (FOI)), to avoid blinding other objects (e.g., occupants of oncoming platforms) detected to be located in the vicinity of the obstacles.

Figure 2:
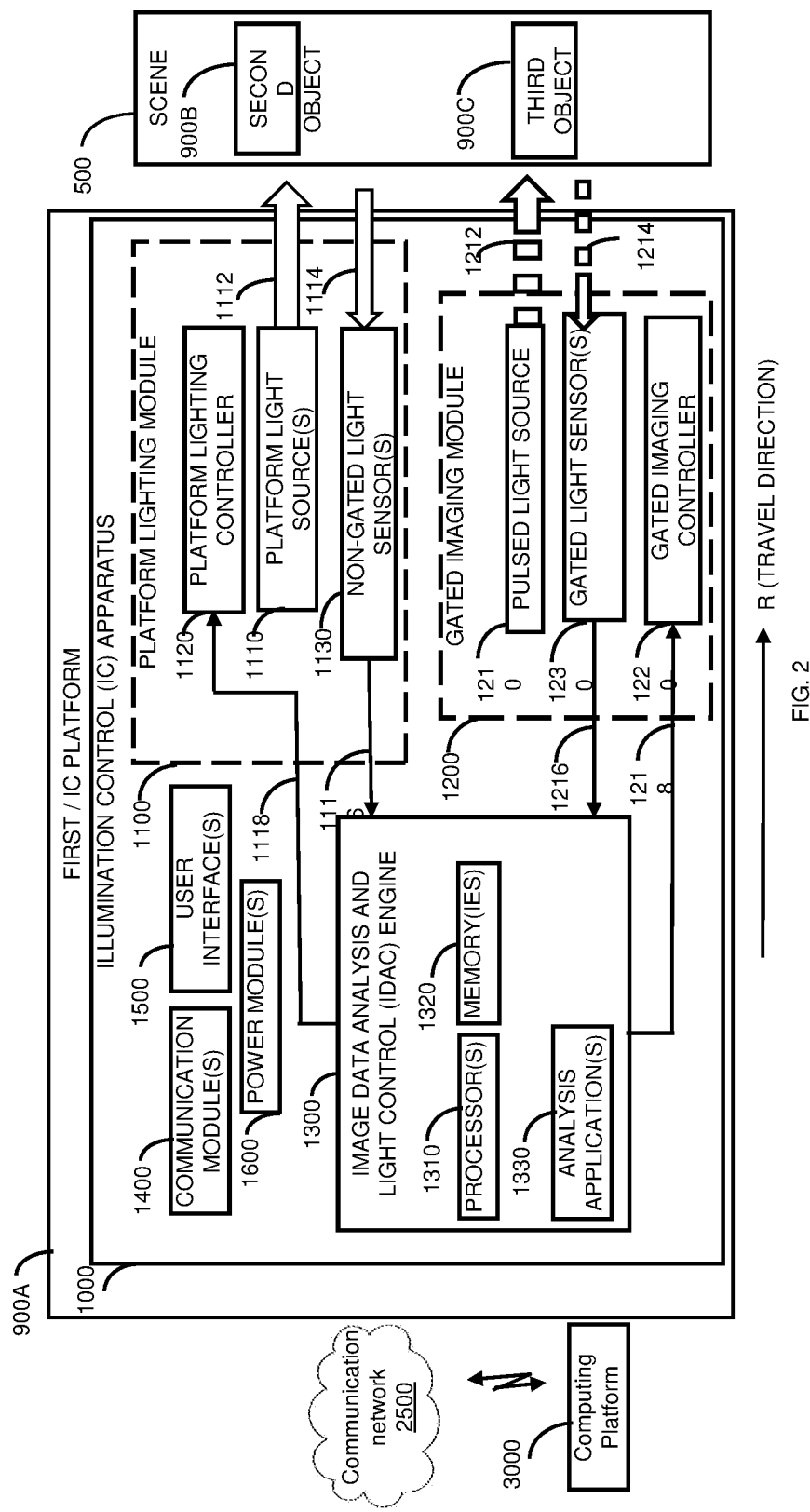
FIG. 2 is a schematic block diagram illustration of a platform lighting control apparatus, according to some embodiments.

In some embodiments, as shown schematically in FIG. 2, illumination control apparatus 1000 may include platform lighting controller 1120 for the adaptive controlling of platform light sources 1110 to emit platform light 1112, schematically indicated herein to propagate in space in positive R direction, and a non-gated light sensor 1130 (e.g., a pixelated image sensor) that is configured to detect reflected light of the visible spectrum as well as non-reflected (also: ambient) light of the visible spectrum, from scene 500. The term "ambient light" as used herein may refer to light emitted from natural and/or artificial light sources and which is free or substantially free of radiation components produced responsive to actively illuminating the scene by the light source(s) employed by illumination control apparatus 1000 and/or free of pixel values originating from other image sensor pixels elements. Natural light sources may for example comprise sunlight, starlight and/or moonlight. Artificial light sources may for example comprise city lights; road lighting (e.g., traffic lights, streetlights); light reflecting from and/or scatter off objects that are present in an environment being imaged; and/or platform (also: platform) lighting systems (e.g. platform headlights such as, for example, platform low and high beams). Optionally, artificial light sources may include light sources of illumination control apparatuses employed by other platforms. Data descriptive of natural light sources may herein be referred to as "passive image data".

Optionally, pixel values descriptive of reflected platform light 1114 detected by non-gated light sensor 1130 may be converted into platform light reflection-based image data 1116 for further analysis by an image analysis and light control (IDAC) engine 1300 of illumination control apparatus 1000.

Platform light source 1110, platform lighting controller 1120 and non-gated light sensor 1130 may exemplarily be considered to constitute a platform lighting module 1100.

Gated imaging module 1200 may comprise one or more pulsed light sources 1210 that are configured to illuminate scene 500, for example, with pulsed light 1212, schematically indicated herein to propagate in space in positive R direction, and a gated imaging controller 1220 for adaptively controlling the operation of pulsed light source(s) 1210. Merely to simplify the discussion that follows, without be construed in a limiting manner, the one or more pulsed light sources may herein be referred to in the singular as "IR light source".

In some embodiments, an inclination of a light beam emitted by a light source may be above the horizon as observable, for example, from the pulsed light source's perspective. Optionally, the inclination of the pulsed light sources may be 1% or less, 0% or less, −1% or less, or −5% or less, when defining an inclination gradient that drops below the horizon as a positive inclination. In some embodiments, a pulsed light inclination angle for actively illuminating the scene can be above the horizon for example observable from the platform lighting.

Illumination control apparatus 1000 further includes, in some embodiments, one or more gated light sensors 1230 that are configured to detect, responsive to illuminating the scene with pulsed light 1212, reflected light (optionally: pulsed reflections) 1214, which may be (e.g., pulsed) narrow-spectrum reflections.

FOVs of non-gated light sensor 1130 and gated light sensor 1230 may differ from each other or be equal. FOIs of platform light source 1110 and pulsed light source 1210 may differ from each other or be equal.

It is noted that merely for the sake of clarity and/or to simplify the discussion herein, certain components may be illustrated as being physically separate from each other. Accordingly, components that are illustrated as being physically separated from each other may optionally be integrated with each other. For example, platform lighting controller 1120 and a gated imaging controller 1220 may be implemented by the same controller. Moreover, the same image sensor may for example be configured to function as non-gated light sensor 1130 and as a gated light sensor 1230. For example, some of the pixels may only be responsive to the spectrum of the pulsed light, and some pixels may only be responsive to light in the visible spectrum. Optionally, non-gated light sensor 1130 and/or gated light sensor 1230 may be integrated with platform lighting (e.g., with one or more of the light sources that are arranged in a matrix configuration) and/or behind the windshield of IC platform 900A.

Gated light sensor 1230 comprises a plurality of pixel elements (not shown). The plurality of pixel elements can be gated to convert the reflections into pixel values and to generate, based on the pixel values, reflection-based image data 1216. In some examples, reflection-based image data may be processed to obtain DOF image data descriptive of, e.g., a depth-of-field (DOF) range of scene 500. DOF image data may be obtained as a result of illumination of scene 500 with pulsed light in timed coordination with multiple pixel sub-exposures of the image sensor during a single image frame readout.

In the description that follows, reflection-based image data may also be referred to as "image slice".

IDAC engine 1300 of illumination control apparatus 1000 may provide control inputs to control the operation of platform lighting controller 1120 and/or a gated imaging controller 1220, which respectively control the operation of platform light source 1110 and pulsed light source 1210.

IDAC engine 1300 of illumination control apparatus 1000 may comprise one or more processors 1310 and one or more memories 1320 for the execution of the methods, processes and/or operations described herein. Processor 1310 may for instance execute instructions stored in memory 1320 resulting in data analysis applications 1330 that analyzes platform light reflection-based image data 1116 and/or reflection-based image data 1216 of pulsed light to generate control data such as platform lighting control data 1118 input to platform lighting controller 1120 for controlling platform light sources 1110 and/or non-gated light sensor 1130; and/or pulsed light control data 1218 input to gated imaging controller 1220 for controlling pulsed light source 1210 and/or for controlling the operation of gated light sensor 1230.

Platform light reflection-based image data 1116 and reflection-based image data 1216 of pulsed light may complement each other, for example, to provide advanced driver-assistance system (ADAS) functions such as; Lane Departure Warning (LDW), Lane Keeping Support (LKS), Forward Collision Warning (FCW), Traffic Sign Recognition (TSR), Intelligent High/Low beam control, traffic lights indication, object detection and classification, parking assist, blind spot detection, in perimeter surveillance applications, autonomous platform functions, platform cabin monitoring, indoor surveillance, home gaming, home appliances control, in gesture recognition and/or other 3D range information-based applications. Platform light reflection-based image data 1116 may be employed to improve quality of reflection-based image data 1216 of pulsed light (e.g., SNR) and vice versa.

In the event that platform lighting module 1100 is inoperable or malfunctions, gated imaging module 1200 may be employed as a redundancy, and vice versa, for example, to meet a predefined safety integrity level (SIL) requirement. For example, data produced by platform lighting module 1100 may be analyzed by IDAC engine 1300 in case of failure of gated imaging module 1200, e.g., for the purpose of object detection. In case of failure of platform lighting module 1100, data produced by gated imaging module 1200 may be analyzed by IDAC engine 1300, e.g., for object detection. Clearly, "redundancy" may refer to additional or alternative functions.

Depending on a current driving condition as determined by IDAC engine 1300, platform light reflection-based image data 1116 and reflection-based image data 1216 generated responsive to pulsed illumination of the scene may be weighted differently for selected data analysis applications 1330. For instance, in case of backscatter detection due to fog and/or during other poor visibility conditions (e.g., in tunnels, at night, etc.) platform light reflection-based image data 1116 may be given less weight than reflection-based image data 1216 generated responsive to generating the scene with pulsed light. In another example, during comparatively good visibility conditions (e.g., during daylight with no sun glaring), platform light reflection-based image data 1116 may be given more weight than light reflection-based image data 1216 of pulsed light. Optionally, weighting of reflection-based image data may be range-dependent. For example, for comparatively closer scene ranges, platform light reflection-based image data 1116 may be given more weight than reflection-based image data 1216 (e.g., IR-based image data), which is generated responsive to illuminating the scene with pulsed light.

In some embodiments, illumination control apparatus 1000 may further comprise one or more communication modules 1400, user interfaces 1500, and/or power modules 1600 for powering the various components, applications and/or elements of illumination control apparatus 1000.

Components, modules and/or elements of illumination control apparatus may be operatively coupled with each other, e.g. may communicate with each other over one or more communication buses (not shown) and/or signal lines (not shown), for implementing methods, processes and/or operations, e.g., as outlined herein.

Without derogating from the aforesaid and merely to simplify the discussion that follows herein, the above-referenced one or more elements having identical or similar functionality and/or structure may herein be referred to in the singular. For instance, "the one or more platform light source(s) 1110" may herein sometimes simply be referred to as "platform light source 1110".

The term "processor", as used herein, may also refer to a controller, and vice versa. Processor 1310, platform lighting controller 1120 and gated imaging controller 1220 may be implemented by various types of controller devices, processor devices and/or processor architectures including, for example, embedded processors, communication processors, graphics processing unit (GPU)-accelerated computing, soft-core processors and/or embedded processors.

Memory 1320 may include one or more types of computer-readable storage media including, for example, transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 1320 may, for example, include, e.g., temporally-based and/or non-temporally based instructions. As long-term memory, memory 1320 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like.

Communication module 1400 may, for example, include I/O device drivers (not shown) and network interface drivers (not shown) for enabling the transmission and/or reception of data over a communication network 2500 for enabling, e.g., communication of components and/or modules of illumination control apparatus 1000 with components, elements and/or modules of IC platform 900A and/or for enabling external communication such as platform-to-platform (V2V), vehicle-to-infrastructure (V2I) or vehicle-to-everything (V2X). For example, components and/or modules of illumination control apparatus 1000 may communicate with a computing platform 3000 that is external to IC platform 900A via communication network 2500. A device driver may for example, interface with a keypad or to a Universal Serial Bus (USB) port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, 5G, Bluetooth® (e.g., Bluetooth smart), ZigBee™, near-field communication (NFC) and/or any other current or future communication network, standard, and/or system.

User Interface 1500 may for example include a keyboard, a touchscreen, an auditory and/or visual display device including, for example, a head up display (HUD), an HMD and/or any other wearable display; an electronic visual display (e.g., an LCD display, an OLED display) and/or any other electronic display, a projector screen, and/or the like. User interface 1500 may issue a potential warning message in response to classifying a situation of a driving condition as a potentially dangerous situation. User Interface 1500 may for example display an image based on reflection-based image data 1216 alone, which reflection-based image data 1216 is generated when illuminating the scene with pulsed light. Optionally, user interface 1500 may display fused image information based on data provided, for example, by non-gated light sensors 1130, gated light sensors 1230 and/or other sensors that are sensing a physical quantity relating to IC platform 900A.

Power module 1600 may comprise an internal power supply (e.g., a rechargeable battery) and/or an interface for allowing connection to an external power supply.

In some embodiments, IDAC engine 1300 is configured to analyze reflection-based image data 1216 of pulsed light to determine a driving condition. Based on the determined driving condition, IDAC engine 1300 generates platform lighting control data 1118 that may be provided to platform lighting controller 1120 for adaptively controlling the operation of platform light sources 1110 to illuminate scene 500 with platform light.

To simplify the discussion that follows, methods and processes disclosed herein may be outlined herein in conjunction with IDAC engine 1300. IDAC engine 1300 may be realized by one or more hardware, software and/or hybrid hardware/software modules, e.g., as outlined herein.

Reflection-based image data 1216 may be generated by illuminating scene 500 with pulsed light 1212 emitted from pulsed light source 1210. The emission of pulsed light 1212 is schematically indicated herein to propagate in space in positive R direction.

Responsive to illuminating scene 500 with pulsed light 1212, reflections 1214 may be reflected from objects 900 located within scene 500 and detected by gated light sensor 1230 to produce reflection-based image data 1216 for further processing by IDAC engine 1300.

The emission of pulsed light 1212 and/or the sensing of reflections 1214 may be characterized by dynamically or adaptively controllable values of pulsed imaging characteristics that can include, for example, the peak output power of pulsed light 1212 to be emitted by pulsed light source 1210; DOF ranges; range of overlap region; amount of slice overlap; image frame readout duration; frame readout start time; frame readout end time; numbers of pixel subsets in an image readout frame; number of pixel elements per subset; exposure time of the pixel elements (e.g., of a pixel subset); rise time and/or fall time of a pixel element; rise time and/or fall time of the pixel elements of a pixel subset; efficiency of signal transfer relating to a pixel element (e.g. by controlling the transfer gate(s) voltage) to the pixel elements of a pixel subset and/or to an image readout frame; image sensor pixel data readout bandwidth per image frame; spatial resolution of data descriptive of a depth map (e.g., reduction in DOF range by 25% and e.g., corresponding increase in spatial resolution), e.g., according to data storage available; image sensor FOV (e.g. to compensate for decreased accuracy or resolution at FOV boundaries compared to the center of the FOV); image sensor Region-of-Interest (ROI); pulsed light duration(s) per image frame; number of times a pulsed light is emitted per image frame; a pulsed light rise time; a pulsed light fall time; peak output power of a pulsed light (e.g., per image frame); light power per slice; pulsing frequency of a pulsed light, e.g., for a certain image frame; individual pulse width; wavelength and/or polarization of light emitted by light source; light source FOI; gated imaging DOF starting point (i.e. $R_{MIN}$), gated imaging DOF end point (i.e. $R_{MAX}$); gated imaging DOF Signal-to-Noise ratio (SNR); number of DOF ranges per image readout frame, gated imaging DOF profile; light cone angles subtended pulsed light (e.g., angle subtended above and/or below horizon; and/or lateral angle relative to optical axis), and/or image data fusion schemes per image frame, etc.

For example, the number of pulses, the peak output power of the illumination light pulses, and/or the pixel element exposure time may be adjusted depending on an amount of light expected to be reflected from scene 500 responsive to an active illumination thereof. For example, fewer pulsed light (e.g., fewer narrow-spectrum and/or broad-spectrum pulses) may be employed to illuminate objects identified as retroreflecting in order to receive (e.g., pulsed) reflections therefrom, since a comparatively large amount of energy may be reflected from such retroreflecting objects (e.g., compared to the amount of light reflected from light diffusive objects). Optionally, a single (e.g., IR) light pulse may suffice to detect and derive information pertaining to a retroreflecting or other highly reflective objects present in scene 500. Optionally, IDAC engine 1300 may determine which information (e.g., road-sign content information) is related to the corresponding retroreflecting and/or highly reflecting objects, e.g., based on analyzing the objects' contour geometry and/or the symbols (e.g., letters, numbers, signs, illustrations, words, sentences) arranged on the objects. For example, responsive to determining that a traffic sign indicates or encodes a warning about an obstacle along the travel direction of IC platform 900A, IDAC engine 1300 may increase the luminescence output power and/or enlarge the target or scene illumination coverage. Optionally, such traffic sign may indicate or encode a distance to the obstacle. IDAC engine 1300 may take into account the traffic sign's indicated distance and the platform's position for illuminating the scene. For instance, IDAC engine 1300 may increase luminescence output power and/or the scene illumination coverage of platform light sources 1110 when a distance between the platform and the obstacle is below a certain distance threshold value. Exemplarily, IR light may be employed to illuminate highly reflecting and/or retroreflecting objects for implementing gated imaging.

Platform light reflection-based image data 1116 may be analyzed by IDAC engine 1300, e.g., to determine a driving condition. Based on the determined driving condition, IDAC engine 1300 may generate pulsed light control data 1218 that is input to gated imaging controller 1220 for adaptively controlling the operation of pulsed light source 1210 and/or gated light sensor 1230, e.g., to adaptively and actively image scene 500 (e.g., in a gated manner) and/or otherwise actively image scene 500.

Generally, based on scene image data (e.g., platform light reflection-based image data 1116, and/or reflection-based image data 1216), IDAC engine 1300 may issue warnings, superimpose symbology displayed to an occupant of IC platform 900A via a head-up display (HUD), provide control outputs to related electronic control units (ECUs) of the platform and/or to values relating to characteristics of scene imaging parameter values (e.g., gated imaging and/or broad-spectrum imaging parameter values).

In other words, the activation and deactivation of pulsed light source 1210 and gated light sensor 1230 can be performed in timed coordination (e.g., in temporal synchronization) and/or spatial coordination with each other by gated imaging controller 1220, to controllably image one or more DOF ranges of scene 500.

Further referring now to FIG. 3A, gated imaging module 1200 may configured to controllably (also: selectively) generate reflection-based image data 1216 descriptive of different DOF ranges to image objects 900 that are located within corresponding DOF ranges from pulsed light source 1210. Information pertaining to DOF ranges may herein also be referred to as "image slices", exemplified in FIG. 3A as image slices S1 and S2 for the gated imaging of objects 901A and 901B. Gated imaging module 1200 may be configured to generate a plurality of image slices S pertaining to different DOF ranges simultaneously or sequentially.

As already indicated herein, pulsed-reflection-based image data 1216 descriptive of one or more image slices S may be analyzed by IDAC engine 1300 to generate platform lighting control data 1118 based on which platform lighting controller 1120 can control platform light sources 1110 to adaptively generate a desired scene illumination pattern in the one or more corresponding DOF ranges.

According to some embodiments, the operation of platform light sources 1110 may be controlled by platform lighting controller 1120 to selectively and adaptively illuminate during a same period or during overlapping time periods scene regions that correspond to different DOF ranges imaged in a gated manner by gated imaging module 1200.

Referring for example to the scenario shown in FIG. 3A, a first DOF range 501 may be imaged during a first time period T1, and a second DOF range 502 may be imaged during a second time period T2 that is different from the first time period T1 to generate corresponding first and second pulsed-reflection-based image data or image slices S1 and S2. In other words, Slices S1 and S2 are imaged during different image frames referred to as T1 and T2. Values of platform light characteristics for illuminating scene 500 may be determined based on the first and second pulsed-reflection-based image data. Platform light characteristics employed for illuminating slice S1 may differ from the platform light characteristic for illuminating slice S2.

It is noted that time periods T1 and T2 may in some instances overlap and, in some other instances, not overlap. In some embodiments, one time period may be encompassed by another time period.

Figure 3B:
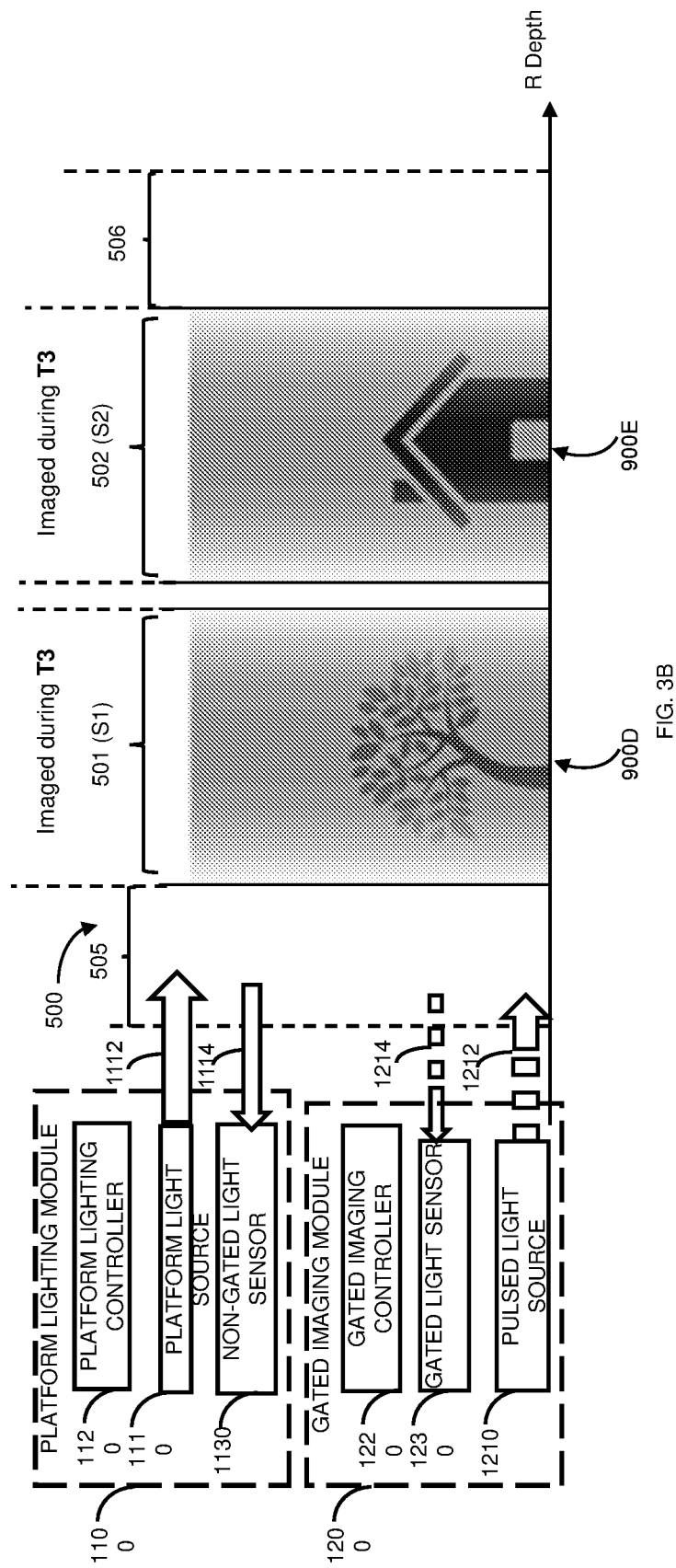
FIG. 3B is a schematic illustration of simultaneous gated imaging of objects in a scene, according to some embodiments.

Further reference is made to FIG. 3B. In some embodiments, slices S1 and S2 may be imaged simultaneously during a same time period T3. In other words, slices S1 and S2 may be imaged during the same image frame having a duration of T3. In the latter case, FIG. 3B exemplifies a snapshot image of a gated imaging scenario of scene 500.

In some embodiments, platform light sources 1110 may be selectively operated to adaptively illuminate scene 500 in accordance with image data that pertains to the imaged DOF ranges (e.g., first and second DOF ranges 501 and 502). Optionally, scene 500 with platform light 1112 may only be adaptively illuminated in accordance with image data pertaining to the DOF ranges.

In some embodiments, reflection-based image data may not be available for certain DOF ranges, exemplified in FIGS. 3A and 3B as first and second non-gated regions 505 and 506. Otherwise stated, during the operation of illumination control apparatus 1000 some regions of scene 500 may not be imaged with pulsed light 1212. Such first and second non-gated regions 505 and 506 may be illuminated with platform light in accordance with dynamically changing platform light characteristics, i.e., the platform light characteristics for illuminating non-gated regions may be forcefully changed according to a predetermined protocol or sequence. Alternatively, platform light characteristics employed for illuminating non-gated regions may remain constant. Optionally, the platform light characteristics for one or more non-gated regions may be altered dynamically, while the platform light characteristics for one or more other non-gated regions may remain or held at a substantially constant level. In some embodiments, the platform light characteristics for one or more non-gated regions may be altered adaptively. Optionally, platform light characteristic for one or more non-gated regions may be altered adaptively, while corresponding other one or more non-gated regions may be illuminated dynamically or by a constant illumination pattern.

In some embodiments, platform light reflection-based image data 1116 and/or reflection-based image data 1216 generated when illuminating the scene with pulsed light (FIG. 2) may be further processed to obtain DOF image data descriptive of two overlapping depth-of-field (DOF) ranges (not shown) defining an overlapping DOF range (not shown). Depth information or a depth map of one or more objects 900 located in the overlapping DOF range of scene 500 may be derived based on at least one first pixel value of a first DOF range in the overlapping DOF region, and further based on at least one second pixel value of a second DOF in the overlapping DOF range. Optionally, the operation of the platform lighting may be adaptively controlled for illuminating scene 500 based on the obtained depth information.

The selective activation and deactivation of platform light source 1110, pulsed light source 1210, non-gated light sensor 1130 and/or gated light sensor 1230 or of pixels thereof may be implemented electronically and/or mechanically (e.g. shutter, digital micromirror device (DMD), etc.). In some embodiments, a pixel of an image sensor (e.g., gated light sensor 1230) can be configured to selectively activated and deactivated by an internal gate array comprising at least one switch and/or transistor. In some embodiments, a pixel can be implemented by employing one or more of the following techniques: CMOS, CCD, and Hybrid CMOS-CCD. In a further example, the one or more image sensors may employ electron-bombarded CMOS (EBCMOS), electron multiplying or EMCCD technology, e.g., to enable the detection of single photon events and/or the selective activation while maintaining comparatively high quantum efficiency. In some embodiments, an image intensifier or phototube may be coupled to the image sensor, e.g., for controlling of the selective activation thereof.

In some embodiments, platform lighting controller 1120 may for example be external and/or internal to, i.e., non-gated light sensor(s) 1130. Gated imaging controller 1220 may for example be external to pulsed light image sensor(s) 1230 and/or internal, i.e., comprised in gated light sensor(s) 1230. Additional or alternative configurations may be employed.

In some embodiments, pulsed light source 1210 may include emitter optics (not shown) configured to adaptively project light, shape the light cone, and/or to adaptively polarize pulsed light. Optionally, the emitter optics may filter pulsed light according to its polarization spectrum and/or optical peak output power. Emitter optics (emitter optics) may further be configured to diffuse light (e.g. by employing holographic diffuser, optical lenses etc.), and/or project one or more FOIs. In an embodiment, emitter optics (not shown) may include a wavelength controller that is based, e.g., on an electrical method (e.g. thermo-electric cooler), a mechanical method, an optical method and/or any other suitable technology that can be employed for controlling (e.g., stabilizing) illumination wavelengths.

In an embodiment, pulsed light source 1210 may comprise a gated imaging controller (e.g., implemented as a part of gated imaging controller 1220) and a power supply (e.g., implemented as a part of power module(s) 1600). Optionally, electrical power can originate from and be provided via electrical power lines (not shown) of IC platform 900A. Optionally, gated imaging controller 1220 may be configured to drive pulsed and/or modulated illumination. Optionally, gated imaging controller 1220 may be configured to control operating parameters of the emitter optics (e.g., of a wavelength controller). Optionally, gated imaging controller 1220 may be configured to receive control signals and configured to operate according to the received control signals (e.g., a trigger signal) from, e.g., a main controller (not shown). Such main controller may for example be implemented as part of gated imaging controller 1220.

According to some embodiments, pulsed light source 1210 may be integrated with and/or arranged in proximity to platform lighting and signaling devices. With respect to automotive lighting for instance, pulsed light source 1210, which may also be a pulsed narrow-spectrum light source, may be integrated, for example, within headlamps, auxiliary lamps, front/back fog lamps, cornering lamps, spotlights, front/back position lamps, daytime running lamps, lateral lights, turn signal lamps, rear position lamps, brake lights, taillights, reversing lamps and/or end-outline marker lamps, etc. For instance, pulsed light may be incorporated with brake lights so that a light cone produced by brake lights encompasses the pulsed light. Optionally, the brake lights may comprise pulsable brake lights, for example, to implement gated imaging in rearward direction.

Optionally, pulsed light source 1210 may be integrated with and/or arranged in proximity to retroreflective objects of IC platform 900A. In some embodiments, pulsed light source 1210 and gated light sensor 1230 may be positioned on and/or incorporated in roof of the platform. In some embodiments, pulsed light source 1210 may be a standalone unit.

In an embodiment, pulsed light source 1210 may comprise two or more light emitting units (not shown) configured to emit light with respectively different operating parameter values. For example, a first light emitting unit may be configured to emit light at a first wavelength range (e.g., in the NIR spectrum) and a second light emitting may be configured to emit light at a second wavelength (e.g., in the SWIR spectrum, in the visible spectrum).

In an embodiment, pulsed light source 1210 may be laser, e.g., a Class 1 laser product (based on IEC 60825-1, edition 3) where the light source intensity (i.e. output optical power) is controlled as a function the velocity of IC platform 900A. For example, above 5 KPH, pulsed light source 1210 may operate at full optical output power, whereas when the speed of IC platform 900A is equal or lower than 5 KPH, the light source's optical output power may be reduced or its operation even stopped.

Optionally, additional driving conditions may be taken into account for adaptively controlling the operation of pulsed light source 1210 and/or gated light sensor 1230.

Further referring to FIG. 4A-4D, platform light sources 1110 may in some embodiments be arranged in the form of a matrix to constitute a matrix lighting arrangement 1111 comprising one or more rows of platform light sources 1110, wherein each one of the one or more rows comprises a plurality of platform light sources 1110. Matrix lighting arrangement 1111(left) exemplified in FIG. 4A comprises one row of selectively controllable platform light sources 1110A(left)-1110C(left) that are individually adaptively and automatically controllable such to adaptively illuminate scene 500 with a desired light distribution pattern in accordance with a momentary and/or expected driving condition.

FIGS. 4B-4D schematically illustrate sequential example illumination patterns employed by platform light sources 1110A(left) to 1110C(left) and by platform light sources 1110A(right) to 1110C(right) at three different time stamps, t1, t2 and t3. Thick continuous line arrows represent bright platform light 1112A emitted by the respective platform light source for illuminating scene 500, whereas thinner line arrows 1112B represent dimmed platform light emitted by the respective platform light source and having less luminous intensity than bright platform light 1112A. An absence of line arrows is to indicate that the respective platform light source 1110 does not illuminate scene 500 (also: "zero illumination"). Optionally, such platform light source may be blanked out, shuttered and/or deactivated.

In the example shown in FIG. 4B, at time stamp t1, platform light sources 1110A(left), 1110C(left) and 1110C (right) illuminate scene 500 with bright platform light 1112A, platform light sources 1110A(right) and 1110B (right) illuminate scene 500 with dimmed platform light 1112B, and platform light source 1110B(left) is blanked or deactivated. In the example shown in FIG. 4C, at time stamp t2, platform light sources 1110A(left) and 1110C(left) illuminate scene 500 with bright platform light 1112A, and platform light source 1110A(right) illuminates scene 500 with dimmed platform light 1112B, and platform light sources 1110B(right) and 1110C(right) are blanked or deactivated. In the example shown in FIG. 4D, at time stamp t3, platform light sources 1110B(left), 1110C(left), 1110A (right), 1110B(right) and 1110A(right) illuminate scene 500 with bright platform light 1112A, and platform light sources 1110A(left) is blanked or deactivated.

While embodiments may herein be disclosed in conjunction with matrix lighting, this should by no means be construed in a limiting manner. Accordingly, additional or alternatively lighting techniques may be employed for adaptively altering platform light characteristics. For instance, platform light sources 1110 may be moveably mounted and operably coupled with an actuator based on, e.g., electronically, mechanically or electro-optics mechanism (not shown) (e.g., a servomotor) that is adaptively controllable by platform lighting controller 1120 for changing an illumination angle. In another example, platform light sources 1110 may be equipped with blinds and/or DMD (not shown) for changing a spread angle. In a yet further example, spectral filters (not shown), and/or mechanical shutters (not shown) may be arranged in front of platform light sources 1110 which are selectively operable for respectively controlling the spectrum and/or illuminance value of platform light 1112 for a certain FOI. Optionally, platform light sources 1110 may be employed in operative association with selectively operable polarizers (not shown).

Figure 5:
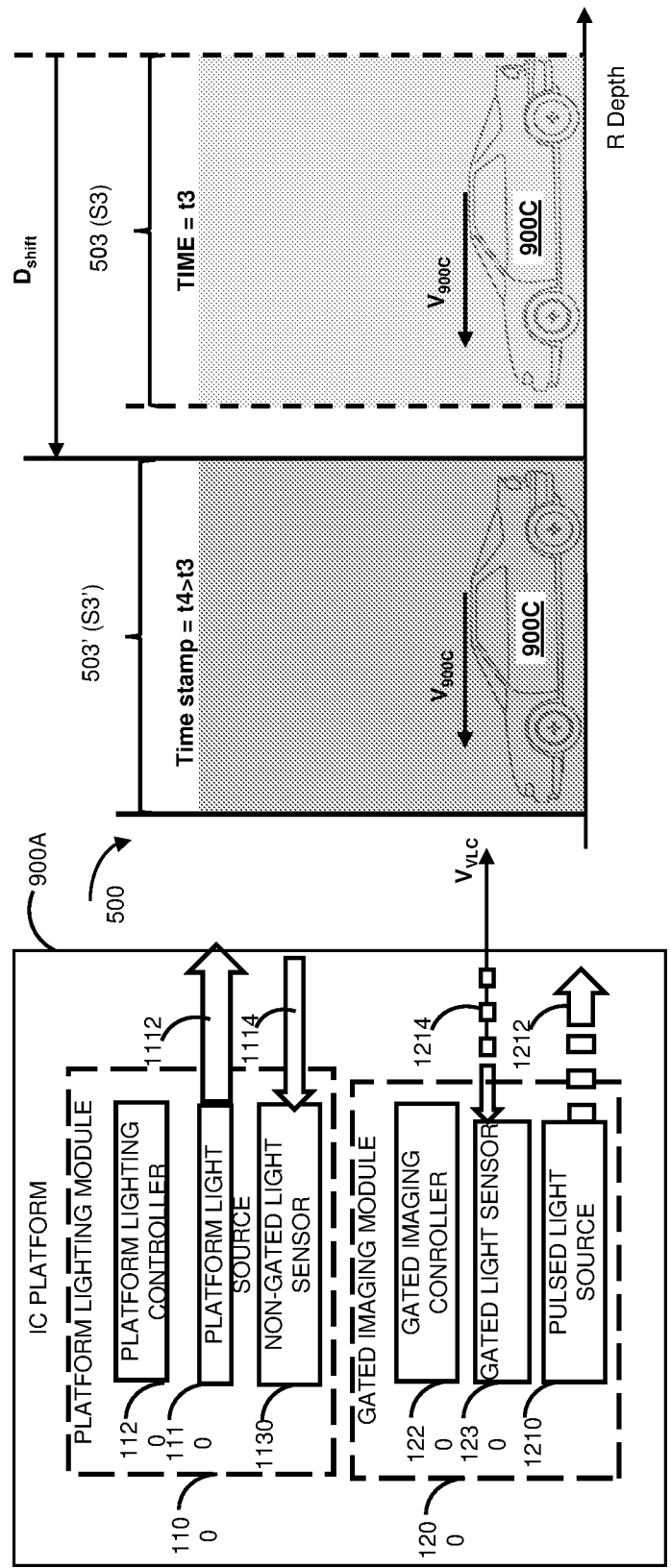
FIG. 5 is a schematic illustration of illuminating a scene with moving platform light based on pulsed light reflections, according to some embodiments.

Additional reference is made to FIG. 5. According to some embodiments, IDAC engine 1300 may take into account velocity and travel direction of IC platform 900A as well as velocity and travel directions of other objects relative to IC platform 900A such as second platform 900B and third platform 900C shown in FIG. 1A.

In the scenario exemplified in FIG. 5, at time stamp time=t3, the direction and velocity of oncoming third platform 900C whose vision systems (e.g., occupants) should not be blinded, is schematically illustrated by arrow $V_{900C}$. A certain computation time $t_{computation}$ may be required to generate reflection-based image data 1216 pertaining to DOF range 503 in which third platform 900C is located, and to produce, based on reflection-based image data 1216, platform lighting control data 1118. During this $T_{computation}$ time period, IC platform 900A and third platform 900C may approach each other by a distance $D_{shift}$. Correspondingly, the distance between IC platform 900A and the DOF range 503 in which third platform 900C was located at time=t3 is reduced by $D_{shift}$.

The said shift $D_{shift}$ is schematically illustrated by DOF range 503' at time stamp t4=t3+$t_{computation}$.

A change in the distance between third platform 900C and IC platform 900A during $T_{computation}$ may be taken into account by IDAC engine 1300 when controlling platform light sources 1110 and/or pulsed light sources 1210. Merely to simplify the above discussion, IC platform 900A is schematically illustrated as being stationary.

Reverting to FIG. 2, the operation of pulsed light sources 1210 may in some embodiments be controlled based on platform light reflection-based image data 1116 that may be descriptive of reflected platform light 1114 that is sensed by non-gated light sensor 1130.

As already indicated herein, platform light reflection-based image data 1116 may be analyzed by IDAC engine 1300, e.g., to determine a driving condition. Based on the determined driving condition, IDAC engine 1300 may generate pulsed light control data 1218 which is input to gated imaging controller 1220 and/or gated light sensors 1230 to adaptively control imaging parameter values, e.g., to adaptively perform gated imaging of scene 500 and/or otherwise actively image scene 500.

As already mentioned herein, a driving condition may, for example, pertain to a current visibility condition. IDAC engine 1300 may thus generate pulsed light control data 1218 depending on such determined visibility condition. For instance, IDAC engine 1300 may increase pulsed peak output power in the presence of fog, and/or adjust (e.g., sweep) gated imaging parameters to image different DOF ranges to determine a distance estimate of an object from IC platform 900A.

A driving condition may also refer to object detection and, optionally, object classification. IDAC engine 1300 may thus generate pulsed light control data 1218 depending on such object detection and, optional object classification. For instance, IDAC engine 1300 may increase pulsed peak output power in the presence of an object of interest, and/or adjust (e.g., sweep) gated imaging parameters to image different DOF ranges to determine a distance estimate of the object of interest from IC platform 900A.

Further referring to FIG. 6, platform lighting module 1100 may in some embodiments be operable to emit pulsed platform light 1512. The activation and deactivation of a pulsed platform light source 1110A and, e.g., gated light sensor 1230, can be performed in timed coordination (e.g., in temporal synchronization) and/or spatial coordination with each other by platform lighting controller 1120, to allow the controlled imaging of, e.g., one or more DOF ranges of scene 500, by converting the pulsed platform light-based reflections 1514 into pixel values. It is noted that, in some embodiments, a sensor different from gated light sensor 1230 may be employed for the acquisition of platform light-based (e.g., pulsed) reflections.

Optionally, a plurality of such DOF ranges do not overlap. Optionally, at least two of the plurality of DOF ranges do overlap. Optionally, based on the generated pixel values, image data may be generated that pertains to one or more selected wavelengths of the (e.g., pulsed) reflections of the emitted platform light. Optionally, the platform light reflection-based image data may be descriptive or comprise data that is descriptive of scene 500 in the selected one or more wavelengths, and optionally, for a DOF range in the scene. For example, platform light reflection-based image data may be descriptive of a DOF range of scene 500 as if it were imaged by one or more narrow-spectrum wavelengths of pulsed platform light-based reflections 1514. Optionally, gated light sensor 1230 is inactive during the generation of pulsed platform light 1512, e.g., in order to reduce or eliminate backscatter.

Accordingly, a broad-spectrum light source of platform lighting can in some embodiments be operable in one of the following at least two operating modes: a "regular illumination mode", e.g., for illuminating scene 500 with platform light 1112, e.g., in an adaptively and controllable manner to improve visibility of a region of scene 500 as incident on a vision system (e.g., the "naked" human eye and/or an image sensor); and a "gated illumination mode" (also: "pulsed illumination mode") for imaging a selected DOF range of scene 500 with pulsed platform light 1512 by gating, in timed coordination, pulsed platform light source 1110A and gated light sensor 1230.

In some embodiments, gated imaging performed by gated imaging module 1200 may be employed to control the pulsing of platform light sources 1110 for implementing platform-lighting-based gated imaging.

Optionally, at instances where scene 500 is illuminated with platform light that can be considered non-pulsed for all practical purposes (i.e., the regular illumination mode), no spectral filtering of broad-spectrum reflections may be performed. Optionally, in the pulsed illumination mode, spectral filtering may be performed. Optionally, spectral filter may be performed in both the regular and the pulsed illumination mode. Optionally, no spectral filtering may be employed in either the regular and the pulsed illumination mode.

While the term "naked" eye refers to seeing something without the help of an instrument (dictionary.cambridge.org), such instrument does not exclude the use of glasses, spectacles, contact lenses and/or other commonplace viewings aids.

Types of platform light source technologies that may be pulsed can include, for example, incandescent lamps (e.g., halogen), electrical gas-discharge lamps (e.g., high-intensity discharge lamps or HID); and/or light emitting diodes (LED). Optionally, an additional light source power unit may be operably coupled with the platform light source to allow the pulsing thereof. Optionally, a platform light source may be operably retrofitted with an additional power unit to allow the pulsing of the platform light source. Optionally, the additional power unit may be pre-installed.

In some embodiments, only one or only some platform light sources of a plurality of platform light sources can be operated in a pulsed illumination mode. In some embodiments, only one or only some platform light sources of a plurality of platform light sources can be operated in an adaptively and controllable manner.

Example platform light sources that may be pulsed can include, for example, dipped beam light sources (e.g., for low beams, passing beams, meeting beams), main beam light sources (e.g., high beam, driving beam, full beams); driving lamps, front fog lamps, conspicuity light sources, cornering lamps; front position lamps; rear position lamps; brake lights; rear fog lamps; and/or reversing lamps.

Employing gated imaging using platform light of pre-installed platform lighting may obviate the need of employing a dedicated pulsed light source 1210 (e.g., IR light source) for the implementation of, e.g., gated imaging techniques; obviate the need of applying procedures and techniques to ensure eye-safety; and/or generally obviate the need of attending to regulatory requirements which might otherwise be necessitated when employing, instead of a dedicated gated imaging module 1200.

The output illumination power for imaging of a selected DOF range may be concentrated on a selected FOI, e.g., when employing DOF range imaging with pulsed platform light 1512 with adaptively controllably matrix platform lighting or otherwise adaptively controllable lighting technologies. It is noted that, in some embodiments, pulsed illumination of scene 500 or a region thereof with pulsed platform light 1512 may be performed in a manner to avoid blinding of other traffic participants, e.g., as indicated herein and/or to increasingly illuminate other traffic participants.

The following are example parameter values for performing gated imaging using platform light and/or pulsed light sources: duration of single pulse Tpulse: ~0.1-1 µs; duration of gating period Tgate: ~0.1-1 µs; number of pulses per image frame: ~1-2500; peak output power: ~100-500 W; frame rate: ~15-240 frames/second (FPS).

Pulsed light sources 1210 may perform better under adverse weather conditions than platform light sources 1110 in active imaging applications, for example, due to comparatively increased spectral spread and/or reduced power of platform light reflections 1114 compared to a spectral spread and/or power of (e.g., pulsed) reflections 1214 incident on gated light sensor 1230 in response to illuminating a scene with pulsed light.

The following are example parameter values for performing gated imaging using IR light sources emitting narrow-spectrum light: duration of each gating period (i.e., individual exposure time period): Tpulse: ~0.1-1 µs; duration of gating period Tgate: ~0.1-1 µs; number of pulses per image frame: ~1-2,500; peak output power; ~100-500 W; frame rate: ~15-240 FPS. Under low light conditions (e.g., under night vision conditions), IR light may employed to image objects at a distance of, for example, ~≥200 meters for a diffusive object having reflectivity of, for example, at least 30% in the NIR range.

Under certain circumstances, pulsed narrow-spectrum light sources may have a comparatively longer lifetime than pulsed platform light sources.

In some embodiments, components of platform lighting module 1100 may be controlled such to selectively and adaptively image a region of scene 500 at one or more selected wavelengths, in timed coordination and/or spatial coordination with gated imaging module 1200. For example, gated light sensor 1230 of gated imaging module 1200 may be employed in timed coordination with platform light sources 1110 for generating data descriptive of pulsed platform or broad-spectrum light reflections responsive to illuminating scene 500 with pulsed platform light 1512.

In another example, non-gated light sensor 1130 may be employed in timed coordination with pulsed light source 1210 for generating data descriptive of pulsed light reflections responsive to illuminating scene 500 with pulsed light 1212.

In further example, platform lighting module 1100 and gated imaging module 1200 may be operated in a time-division multiplexing manner to (e.g., alternatingly) generate data descriptive of pulsed light reflections, responsive to illuminating scene with pulsed platform light and pulsed narrow-spectrum light, respectively, for example, to alternatingly generate image data descriptive of various DOF ranges of scene 500.

Platform lighting module 1100 and gated imaging module 1200 may operate in temporal-spatial coordination such that the operation of platform lighting module 1100 does not adversely affect the operation of gated imaging module 1200 and vice versa. In some embodiment, platform lighting module 1100 and gated imaging module 1200 may operate in temporal-spatial coordination such that the operation of platform lighting module 1100 complements the operation of gated imaging module 1200, and vice versa.

Further reference is made to FIG. 7A. In some embodiments, IC platform 900A may comprise a plurality of illumination control apparatuses 1000 (e.g., first and second apparatuses 1000A and 1000B), each having at least one illuminator and image sensor, e.g., as described above, e.g., to increase the output illumination power, angular and spatial resolution, and/or frame rate, etc.

Further referring to FIG. 7B, a gated imaging method may for example be implemented by a plurality of illumination control apparatuses 1000 (e.g., third to sixth illumination control apparatuses 1000C-1000F, respectively) that are respectively employed by a plurality of platforms (e.g., third to sixth platforms 900C-900F, respectively), e.g., to increase the output illumination power, angular resolution, spatial resolution, and/or frame rate. In some embodiments, one or more IC platforms may employ two or more illumination control apparatuses. For instance, as exemplified in FIG. 8B, fifth IC platform 900E may employ illumination control apparatuses 1000E(i) and 1000E(ii).

Figure 8A:
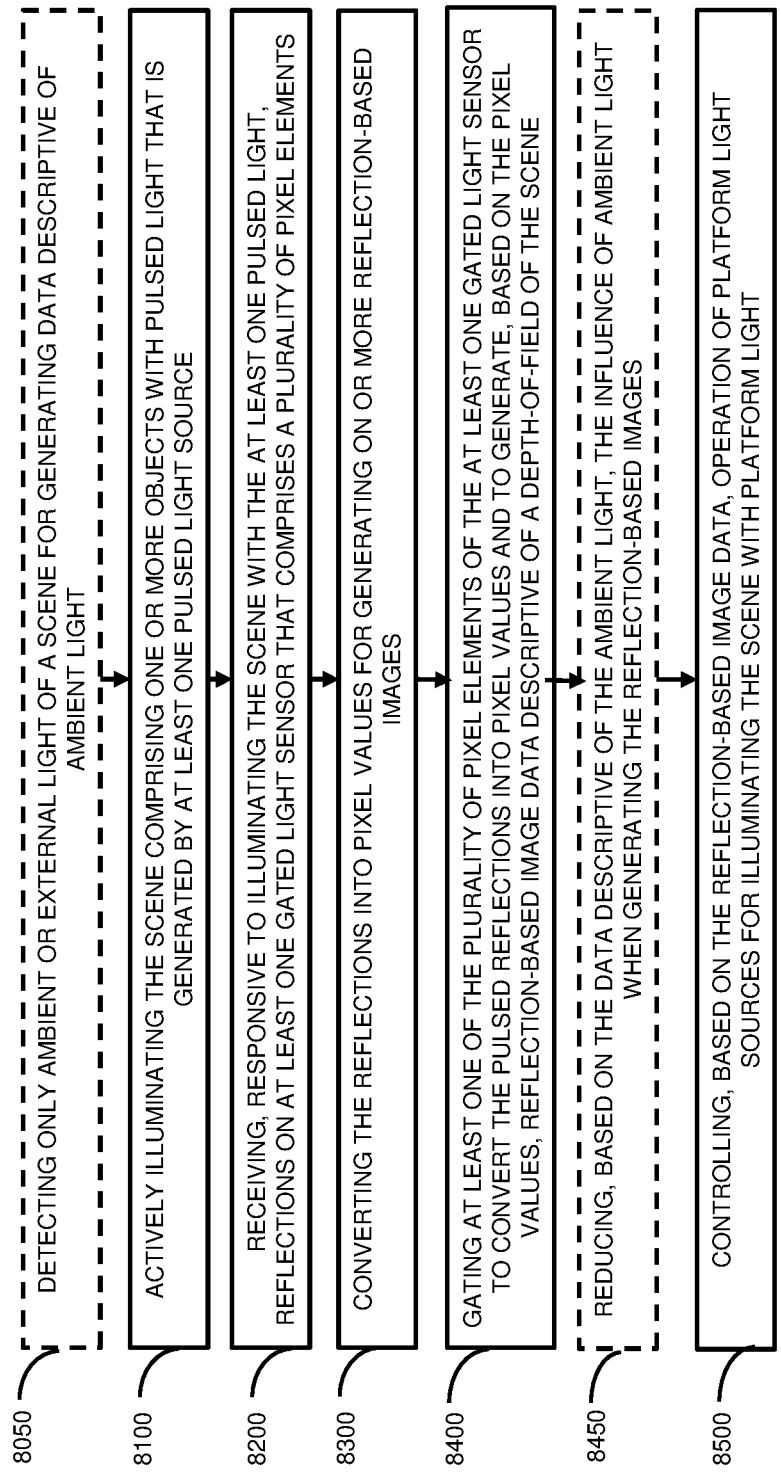
FIG. 8A is a flowchart diagram of a moving platform lighting control method, according to some embodiments.
Figure 8B:
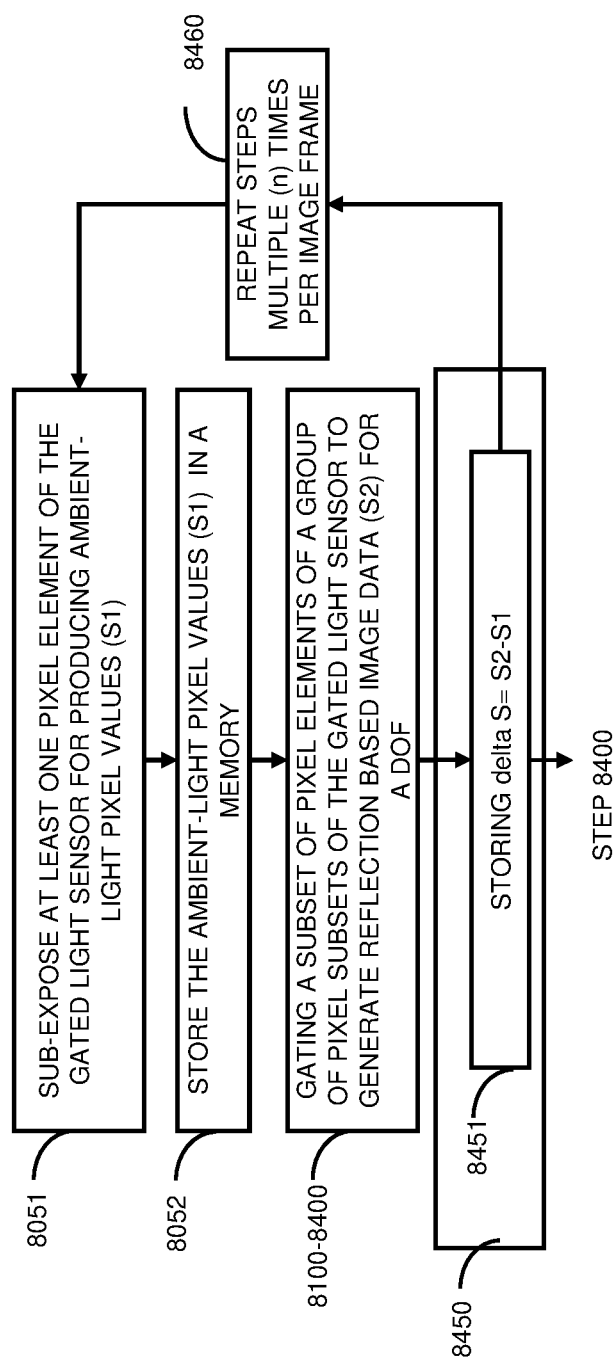
FIG. 8B is a flowchart diagram of a method for reducing the influence of ambient light induced artifacts in the moving platform lighting control method.

In an embodiment, the light sources and sensors of platform lighting module 1100 and gated imaging module 1200 of at least two of the illumination control apparatuses 1000 exemplified in FIG. 8B may have different FOVs and/or FOIs.

Image data that are produced by a plurality of platform lighting modules 1100 and/or gated imaging modules 1200 and that have overlapping FOV may be combined to generate larger images by employing image stitching.

According to some embodiments, the plurality of illumination control apparatuses 1000 employed by platforms 900 may be operated to reduce or avoid mutual interference or otherwise inadvertent interaction between different illumination control apparatuses. For example, management unit 400 may control the operation (e.g. via V2V communication) of the plurality of illumination control apparatuses 1000C-1000F. In another example, gated imaging may be performed by applying random operating parameters to reduce or avoid inadvertent interaction, e.g., between illumination control apparatuses 1000C-1000F. For example, a random delay between gated frame acquisitions may be applied, e.g., to reduce errors that may otherwise be introduced into the output provided by third illumination control apparatus 1000C by the active illumination of the same scene by fourth to sixth illumination control apparatuses 1000D-1000F. Optionally, random frame starting and/or ending time may be employed. Optionally, when using a plurality of pixel subsets within the same frame for imaging a respective plurality of DOFs, the pixel subsets may be gated randomly.

In some embodiments, platform position data descriptive of position-time tuple information of moving platforms 900 may be taken into account to coordinate the operation of the illumination control apparatuses 1000 employed by the platforms. For example, time shifting of gated imaging acquisition may be imposed on illumination control apparatuses that are determined to be in relatively close proximity to each other (e.g., within 50 meters distance from other).

In some embodiments, the operation of the various platform light sources of platforms 900A-900F may be controlled based on reflection-based image data, while taking into account the positions and/or other driving conditions of the moving platforms (e.g., velocity, traversing direction, to avoid glaring of vision systems thereof. For example, light emitted by platform light sources may be controlled such to avoid glaring due to retroreflection.

In some embodiments, different scene regions may be allocated to each illumination control apparatus by management unit 400 that is operably connected with all the illumination control apparatuses. The allocation may be done in a way that improves the measurement resolution and/or shortens update duration.

In some embodiments, multiple illumination control apparatuses 1000 may be operated to image the same ROI and/or DOF to improve range finding accuracy and/or accuracies of depth map estimates compared to depth map estimates that may be obtained if only one illumination control apparatus is employed. In some embodiment, reflection-based image data received from multiple illumination control apparatuses 1000 may be weighted and combined to obtain improved depth map estimates. The weighting may be performed adaptively and automatically.

According to some embodiments, scene illumination with platform light, e.g., for DOF ranging and/or depth mapping may be performed based on image data produce by illumination control apparatuses employed by different platforms using light sources of identical or different types. For example, a first DOF may be imaged by a third illumination control apparatus 1000C of a third platform 900C using pulsed light, and a second DOF may be imaged by using a fourth illumination control apparatus 1000D of a fourth platform 900D using pulsed light 1212 and, based on the first and the second DOF, a depth map may be generated for a scene portion comprised in the first and/or second DOF.

According to some embodiments, components of platform lighting and/or gated imaging modules of different platforms may be controlled in timed coordination with each other to illuminate a region of scene 500 with destructively and/or constructively interfering wavelengths.

For example, platform light sources of a first and second platform located in scene 500 may be operated in timed coordination to adaptively illuminate scene 500 such to avoid blinding of traffic participants in one scene region while combining luminance in another scene region.

In some embodiments, image data descriptive of ambient (also: passive) light may be taken into account to generate control data such as platform lighting control data 1118 and/or pulsed light control data 1218.

In some embodiments, ambient light may be taken into account in the sense that it may be subtracted from image data descriptive of the sum of sensed active and passive light components.

For example, one or more of the pixel elements (not shown) of non-gated light sensor 1130 and/or gated light sensor 1230 may be operated in a "passive" manner in the sense that the operation of such passive pixel elements is not controlled in coordination with platform light sources 1110 and/or pulsed light source 1210, in order to generate passive image data. In other words, the operating parameters of a passive pixel are independent of the operation of pulsed light source 1210.

A signal value generated by such passive pixel element may for example be used for providing non-gated pixel data for analysis application(s) 1330, e.g., to subtract or offset external signal values relating to external or ambient light sources (e.g., sun light, passive IR radiation/IR radiation due to thermal signature), and/or to subtract signal values originating from other image sensor pixels elements. The signal value may adaptively change, e.g., depending on the amount of detected ambient light. Optionally, the signal value of a passive pixel element may be employed to (e.g., adaptively) set a threshold (e.g., a cutoff value) for other pixel value signal accumulation modes. A pixel element operating in this "passive" mode may have a single exposure per frame readout or multiple exposures per pixel value readout.

In some embodiments, data descriptive of ambient light may be subtracted from image data to obtain reflection-based image data (e.g., platform light reflection-based image data 1116, and reflection-based image data 1216, wherein the latter may generated when illuminating the scene with pulsed IR light or light in any other non-visible spectrum).

In some embodiments, subtraction may be performed pixel-wise and prior to the optional display of image information to the user.

In some embodiments, the signal value of a passive pixel element may be used for gated imaging timing/coordination purposes of a scene that is imaged by multiple illumination control apparatuses. Due to the fact that a illumination control apparatus can operate in a comparatively low overall duty cycle (e.g., a illumination control apparatus does not necessarily have to emit light all the time) each one of the illumination control apparatuses may use its passive pixel elements to sense if any one of the other Illumination control apparatuses located in the vicinity of illumination control apparatus 1000 are actively imaging scene 500. A given illumination control apparatus may be idle or inactive (not actively image scene 500) during time periods in which the number of actively illuminating illumination control apparatuses is above a high threshold. Light sources of the given illumination control apparatus may be activated at other time periods such to image scene 500 (e.g., for performing gated imaging), when the given illumination control apparatus senses during the other time periods that the number of illumination control apparatuses which actively illuminate scene 500 drops to below a low-threshold.

In this manner, the probability that the plurality of Illumination control apparatuses adversely affect each other's (e.g., gated) imaging operations (e.g., glare each other) may be reduced or minimized.

In some embodiments, the plurality of illumination control apparatuses may operate according to a time-divisions multiplexing procedure so that in a certain geographic area, only one illumination control apparatus 1000 at a time may actively illuminate a scene with the respective type of light.

A geographic area may be defined as a geographic region in which there can be in direct line-of-sight (LOS) between platforms, optionally while not taking into account other traffic participants. Additionally or alternatively, a geographic area may be a predefined section whose boundaries may be defined by addresses, geographical coordinates, and/or by the location and/or distances from physical objects of the geographic area. In view of the aforesaid, for a given geographic area, the number and/or the identities of the platforms that are member of the system may change over time.

Additional reference is made to FIG. 8A. A method for controllably and adaptively illuminating a scene by one or more illumination control apparatuses of a platform comprises, as indicated by step 8100, actively illuminating scene 500 comprising one or more objects with pulsed light that is generated by at least one pulsed light source.

As indicated by step 8200, the method further includes receiving, responsive to illuminating the scene with the pulsed light, reflections on at least one image sensor that comprises a plurality of pixel elements. As indicated by step 8300, the method may include converting the reflections into pixel values for generating one or more reflection-based images. Optionally, at least one of the plurality of pixels elements of the at least one image sensor may be gated for generating reflection-based images that are descriptive of one or more depth-of-field (DOF) ranges of scene 500.

As indicated by step 8400, the method includes gating at least one of the plurality of pixel elements of the at least one image sensor to convert the reflections into pixel values and to generate, based on the pixel values, reflection-based image data.

As indicated by step 8500, the method further includes controlling, based on the reflection-based image data, operation of platform lighting of the illumination control apparatus for illuminating the scene with platform light. Optionally, the controlling of the platform lighting may be performed such that at least two of the plurality of different scene regions are subjected to different illumination intensities. The term "illumination intensity" as used herein may refer to the luminous flux incident on a surface. For example, if the at least two different scene regions have the same reflectance, they will reflect light at correspondingly different intensities due to the different levels of luminous flux.

According to some embodiments, the method may include a procedure (optionally, mainly during day-time) that takes into account the influence of ambient light when producing reflection-based images. For example, as indicated by step 8050, the method may include, prior to actively illuminating a scene, detecting ambient light only for generating data that is descriptive of ambient light only. Detecting ambient light only may be accomplished by exposing (e.g., activating) a selection of pixel elements of, non-gated light sensor 1130, while the light received from scene 500 is free (including substantially free) of radiation components that would be reflected from scene 500 responsive to actively illuminating scene 500 by platform light source 1110 and/or pulsed light source 1210.

Further, as indicated by step 8450, the method may include reducing, based on the data that is descriptive of the ambient light, the influence of ambient light when generating the reflection-based images, which are generated responsive to actively illuminating the scene (step 8400), e.g., to reduce or eliminate ambient-light induced artifacts.

In some embodiments, a procedure of detecting ambient light only, may occur at least once or a plurality of times per image readout frame. For example, one or more pixel elements may be passively exposed to ambient light only, prior to each sub-exposure of a pixel subset for imaging a scene region. Optionally, the ambient-light pixel values of each sub-exposure may be accumulated and subtracted prior to readout of the image frame (i.e. subtraction may be done within the pixel). Optionally, an excess threshold may be determined based on the (e.g., accumulated) ambient-light pixel values. Optionally, pixel values for producing reflection-based images may be capped by the excess threshold.

By imaging both ambient light as well as light reflected due to illumination of scene 500 in a single readout frame, depth maps may be determined faster compared to the time required for determining a depth map in which ambient light and a DOF are imaged and readout each time in a separate frame.

Additional reference is made to FIG. 8B. Step 8050 may for example include (step 8051) sub-exposing at least one pixel element of an image sensor (e.g., non-gated light sensor 1130) to produce ambient-light pixel values (S1). The method may then include storing the ambient-light pixel values S1 in a memory (e.g., memory 1320) of illumination control apparatus (step 8052). A memory of illumination control apparatus (step 8052) may be implemented in the pixel level and/or in the image sensors and/or in the illumination control apparatus (e.g. camera unit consisting the image sensor, external memory or the camera unit etc.). The method may then include performing the steps 8100-8300 of FIG. 8A, which can for example be collectively referred to as generating reflection-based image data (S2) for a scene region of scene 500 (e.g., a DOF range), which may then be followed by step 8450 of reducing, based on the data descriptive of the ambient light, the influence of ambient light when generating the reflection-based images. Step 8450 may include, for example, storing delta S=S2−S1 (step 8451). As indicated by step 8460, the steps 8051-8451 illustrated in FIG. 8B may be repeated multiple (n) times in accordance with the number of times regions of scene 500 are illuminated for imaging thereof, prior to readout of signal S×n (i.e. n(S2−S1), neglecting any associated noise) thereof.

In some embodiments, sub-exposing at least one pixel element for producing ambient light pixel values as well as gating a subset of pixel elements of a group of pixel subsets may occur, for example, at least 500, 600, 700, 800, 900, 1000 times per image frame. In other words, the steps 8051-8451 shown in FIG. 8B may be executed at least 500, 600, 700, 800, 900, 1000 times per image frame. The duration of an image may be, for example, 1 millisecond or less. The shorter the delay between the sub-exposure for collecting ambient light only, and the sub-exposure for gated imaging, edge artifacts may become less visible. It is noted that the same statement may hold true if the sensor's pixel elements are all fully exposed for ambient light sensing and gated imaging. During ambient light sensing by an image sensor (e.g., non-gated light sensor 1130), neither platform light source 1110 nor pulsed light source 1210 actively emit light. According to the operating sequence discussed in conjunction with FIG. 8B, the ambient light sensing and gated imaging can be performed in a temporally alternating manner.

In some embodiments, in order to cope with fast varying scenes (usually due to high driving velocity), image registration may be applied on the raw data determining a depth estimate. In a more specific example, the motion between consecutive frames can be non-rigid, e.g., due to motion of IC platform 900A in scene 500 causing "zooming" of the scene at an image sensor (e.g., gated light sensor 1230) and/or due to motion of other objects (e.g., cars) in the scene relative to IC platform 900A. In order to register under such changing imaging conditions, the pixel values that are obtained at a same pixel position in one frame and in a subsequent frame to the same surface area of an object, a local movement vector field may be required for exact and correct pixel value registration. This can for example be achieved by incorporating optical flow techniques on two consecutive frames to produce such local movement vector field of the movement for every pixel in the scene.

In embodiments, non-gated light sensor 1130 and/or gated light sensor 1230 may accumulate photons (also: light) incident thereon from scene 500 over a time period that exceeds a gating time interval required to image a desired DOF range, thereby producing accumulated reflection data. The accumulated reflection data may be used to update or otherwise modify reflection-based image data to obtain updated reflection-based image data exhibiting improved quality characteristics. Improved data quality characteristics may manifest themselves, for example, in comparatively reduced signal-to-noise ratio (SNR) and/or in improving the values of other quality metrics.

ADDITIONAL EXAMPLES

Example 1 concerns methods and apparatuses for controlling the operation of a platform lighting. The methods comprise and the apparatuses are configured to: actively illuminate a scene with pulsed light generated by at least one pulsed light source of a platform for generating reflections from the scene; gating, in timed coordination with the active illumination of the scene, at least one of a plurality of pixel elements of at least one image sensor of the platform; receiving at the at least one gated pixel element at least some of the reflections from the scene; generating, based on the received reflections, reflection-based image data descriptive of the scene; and controlling, based on the reflection-based image data, the operation of platform lighting to illuminate a plurality of different regions of the scene with visible spectrum light.

In some examples, the platform lighting comprises one or more light sources. In some examples, the platform lighting comprises a plurality of light sources, e.g., in a matrix arrangement.

In some examples, the platform lighting is controlled e.g., based on the reflection-based image data, such that a plurality of different scene regions are (e.g., simultaneously) subjected to different scene illumination intensities. For instance, a first scene region may be (e.g., simultaneously) subjected to lower or higher illumination intensity than a second scene region.

In some examples, based on the reflection-based image data for example, the operation of platform lighting is controlled to (e.g., simultaneously) output light having a first output illumination power towards at least one first scene region, and to output light having a second output illumination power (different from the first output illumination power) towards at least one second scene region (different from the first scene region).

In some examples, based on the reflection-based image data, the operation of platform lighting comprising a plurality of light sources configured in a matrix arrangement is controlled to, e.g., simultaneously, output light towards at least one first scene region and at least one second scene region (different from the first scene region) at different output illumination powers.

In some examples, based on the reflection-based image data, the operation of platform lighting is controlled to (e.g., simultaneously) output light having different illumination power towards at least one first scene region and at least one second scene region such that such that the at least one first scene region and the at least one second scene region (different from the first scene region) are (e.g., simultaneously) subjected to different scene illumination intensities.

Example 2 includes the subject matter of example 1 and, optionally, wherein the at least two of the plurality of scene regions are subjected to at least two different scene illumination intensities during a same time period.

Example 3 includes the subject matter of any one of the examples 1 or 2 and, optionally, determining, based on the reflection-based image data, a driving condition; and adaptively controlling, based on the determined driving condition, the operation of the platform lighting.

Example 4 includes the subject matter of any one of the examples 1 to 3 and, optionally, wherein a first scene region of the at least two scene regions is not illuminated or illuminated with less output illumination power than a second scene region of the at least two scene regions.

Example 5 includes the subject matter of any one of the examples 1 to 4 and, optionally, wherein the reflection-based image data is processed to obtain DOF image data descriptive of a depth-of-field of the scene that extends beyond an illumination range of the platform lighting.

Example 6 includes the subject matter of any one of the examples 1 to 5 and, optionally, wherein a pulsed light inclination angle for actively illuminating the scene can be 1% or less, 0% or less, −1% or less, or −5% or less.

Example 7 includes the subject matter of any one of the examples 1 to 6 and, optionally, wherein a pulsed light inclination angle for actively illuminating the scene can be above the horizon as observable from the platform lighting and/or above a platform lighting inclination angle.

Example 8 includes the subject matter of any one of the examples 1 to 7 and, optionally, wherein controlling the platform lighting is performed such to avoid blinding of objects located in the scene by the illuminating platform lighting.

Example 9 includes the subject matter of any one of the examples 1 to 8 and, optionally, controlling illumination of the scene with platform lighting to illuminate the at least one first scene region with a first illumination pattern that is different from a second illumination pattern of at least one second scene region.

Example 10 includes the subject matter of any one of the examples 1 to 9 and, optionally, wherein at least one first and at least one second scene region of the plurality of scene regions are partially overlapping or non-overlapping.

Example 11 includes the subject matter of any one of the examples 1 to 10 and, optionally, a dipped beam light source; a main beam light source; a spotlight; a front fog lamp; a rear fog lamp; a daytime conspicuity light source; a rear position lamp; a brake light; a reversing lamp or any combination of the aforesaid.

Example 12 includes the subject matter of any one of the examples 1 to 12 and, optionally, incandescent lamps, light emitting diodes; a high intensity discharge lamps; or any combination of the aforesaid.

Example 13 includes the subject matter of any one of the examples 1 to 13 and, optionally, wherein the at least one pulsed light source and the at least one image sensor are comprised in a platform, and arranged and configured such that the reflection-based image data is descriptive of image information of a field of view extending in a direction which is different from a current direction of travel of the platform in the scene.

Example 14 includes the subject matter of any one of the examples 1 to 13 and, optionally, controlling, based on the reflection-based image data, a plurality of light sources of the platform lighting, wherein the plurality of light sources is configured in a matrix arrangement.

Example 15 includes the subject matter of any one of the examples 1 to 14 and, optionally, wherein the field of view extends in a direction which is about opposite a current direction of travel of the platform Example 16 includes the subject matter of any one of the examples 1 to 16 and, optionally, wherein the pulsed light source and the at least one image sensors are comprised in a platform and are arranged and configured such that the reflection-based image data is descriptive of image information of a field of view extending in a direction that is different from a forward-facing orientation of the platform.

Example 17 includes the subject matter of any one of the examples 1 to 16 and, optionally, wherein the at least one image sensor are arranged and configured such that the reflection-based image data provides panoramic image information of the scene.

Example 18 includes the subject matter of any one of the examples 1 to 17 and, optionally, wherein the gating of at least one of the plurality of pixel elements is performed electronically and/or mechanically.

Example 19 includes the subject matter of any one of the examples 1 to 18 and, optionally, wherein gating is implemented by a mechanical shutter and/or by a digital micro-mirror device.

Example 20 includes the subject matter of any one of the examples 1 to 19 and, optionally, wherein electronic gating employs at least one switch and/or transistor.

Example 21 includes the subject matter of any one of the examples 1 to 20 and, optionally, wherein a plurality of readout frames are employed for imaging the same DOF.

Example 22 concerns a platform lighting control (VLC) apparatus for controlling the operation of platform lighting, the illumination control apparatus comprising: one or more memories and one or more processors operable to execute instructions stored in the one or more memories to cause performing the following steps: actively illuminating a scene with pulsed light generated by at least one pulsed light source for generating scene reflections; receiving at least some of the scene reflections on at least one image sensor, the image sensor comprising a plurality of pixel elements; gating at least one of the plurality of pixel elements of the at least one image sensor to convert the received scene reflections into pixel values and to generate, based on the pixel values, reflection-based image data; and controlling, based on the reflection-based image data, the operation of platform lighting to illuminate at least one first scene region and at least one second scene region with different illumination power.

Example 23 includes the subject matter of example 22 and, optionally, wherein the one or more processors are operable to execute instructions stored in one or more memories to cause the apparatus to perform the following steps:

Example 24 includes the subject matter of examples 22 or 23 and, optionally, determining, based on the reflection-based image data, a driving condition; and adaptively controlling the platform lighting based on the determined driving condition.

Example 25 includes the subject matter of any one of the examples 22 to 24 and, optionally, wherein the reflection-based image data is descriptive of a depth-of-field of the scene that extends beyond an illumination range of platform lighting.

Example 25 includes the subject matter of any one of the examples 22 to 24 and, optionally, wherein the controlling of platform lighting is performed such to avoid blinding of objects located in the scene by the illuminating platform lighting.

Example 26 includes the subject matter of any one of the examples 22 to 25 and, optionally, wherein the one or more processors are operable to execute instructions stored in one or more memories such to control illumination of the scene by the at least one platform lighting to illuminate the at least one first and second scene regions with a first and a second illumination pattern that are different from each other.

Example 27 includes the subject matter of any one of the examples 22 to 25 and, optionally, wherein the one or more processors are operable to execute instructions stored in the one or more memories to cause controlling, based on the reflection-based image data, the operation of a plurality of light sources of the platform lighting, wherein the plurality of light sources are configured in a matrix arrangement.

Example 28 concerns a platform lighting control (VLC) apparatus for controlling the operation of platform lighting of a platform located in a scene, the illumination control apparatus comprising: one or more pulsed light sources operable to actively illuminate a scene with pulsed light which is generated by at least one pulsed light source of the illumination control apparatus for generating reflections; one or more light sensor operable to receive at least some of the reflections on one or more image sensors of the illumination control apparatus; wherein the one or more light sensors comprise a plurality of pixel elements that can be gated to convert received reflections into pixel values and to generate, based on the pixel values, reflection-based image data descriptive of the scene; and one or more controllers that are operable to control, based on the reflection-based image data, the operation of platform lighting for illuminating the scene to illuminate a first and a second scene region with respectively different first and second levels of illumination, the platform lighting comprising at least one platform light source.

Example 29 includes the subject matter of example 28 and, optionally, an image data and light control (IDAC) engine that is operable to determine, based on the reflection-based image data, a driving condition; and wherein the IDAC engine is further operable to adaptively control, based on the determined driving condition, the operation of the platform lighting.

Example 30 includes the subject matter of any one of the examples 28 or 29 and, optionally, wherein the reflection-based image data is descriptive of a depth-of-field of the scene that extends beyond an illumination range of the platform lighting.

Example 31 includes the subject matter of any one of the examples 28 to 30 and, optionally, wherein the one or more controllers control the platform lighting such to avoid blinding of objects located in the scene by the illuminating platform lighting.

Example 32 includes the subject matter of any one of the examples 28 to 31 and, optionally, wherein the one or more controllers control the illumination of the scene by the platform lighting such to illuminate the at least one first scene region with a first illumination pattern that is different from a second illumination pattern of the at least one second scene region.

Example 33 includes the subject matter of any one of the examples 28 to 32 and, optionally, wherein the at least one first and the at least one second scene regions are partially overlapping or non-overlapping.

Example 34 includes the subject matter of any one of the examples 28 to 33 and, optionally, wherein the at least one platform light source comprises: a dipped beam light source; a main beam light source; a spotlight; a front fog lamp; a rear fog lamp; a daytime conspicuity light source; a rear position lamp; a brake light; a reversing lamp or any combination of the aforesaid.

Example 35 includes the subject matter of any one of the examples 28 to 34 and, optionally, wherein the platform lighting includes one or more of the following: incandescent lamps; light emitting diodes; a high intensity discharge lamps; laser-based light sources; or any combination of the aforesaid.

Example 36 includes the subject matter of any one of the examples 28 to 35 and, optionally, wherein the platform lighting comprises a plurality of light sources that are configured in a matrix arrangement, wherein the light sources are controlled based on the reflection-based image data.

Example 37 includes the subject matter of any one of the examples 28 to 36 and, optionally, wherein the pulsed light source and the at least one image sensors are comprised in the platform, and arranged and configured such that the reflection-based image data is descriptive of image information of a field of view extending in a direction which is different from a current direction of travel of the platform in the scene.

Example 38 includes the subject matter of example 37 and, optionally, wherein the field of view extends in a direction which is about opposite a current direction of travel of the platform.

Example 39 includes the subject matter of any one of the examples 28 to 38 and, optionally, wherein the gating of at least one of the plurality of pixel elements is performed electronically and/or mechanically.

Example 40 concerns a platform lighting control system comprising: a plurality of illumination control apparatuses according to any one of the examples 23 to 40 and, optionally, wherein the plurality of illumination control apparatuses is employable by at least one or a plurality of platforms for performing optionally a method according to any one of examples 1 to 22.

Example 41 includes the subject matter of example 40 and, optionally, wherein the plurality of illumination control apparatuses are employable by at least two platforms and comprise a plurality of controllers that are operative to control operation of the pulsed light sources and to gate the pixels of the sensors of the plurality of illumination control apparatuses in coordination with each other or randomly so that scene illumination with light emitted by platform lighting can be performed with comparatively little or without mutual interference between the plurality of illumination control apparatuses.

Example 42 includes the subject matter of any one of the examples 40 or 41 and, optionally, wherein the at least two platforms comprise a plurality of controllers that are operative to control the platform light sources in coordination with each other or randomly so that scene illumination can be performed simultaneously with comparatively reduced or without causing glaring of vision systems of one or more of the at least two platforms.

Example 43 includes a computer-program product with a program code for the execution of the method steps according to any one of the examples 1 to 21 when the program product is executed on a computer.

Example 44 includes a computer program product that is directly loadable into an internal memory of a digital computer, the computer program product comprising software code portions to perform the steps of any one of the examples 1 to 21 when the computer program product is run on a computer.

Example 45 includes the use of an apparatus according to any one of the examples 22 to 39.

Any digital computer system, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

Additionally or alternatively, the methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

The term "constant" as used also encompasses the term "substantially constant".

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not to be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A, B, C, or any combination of the aforesaid" should be interpreted as meaning all of the following: (i) A or B or C or any combination of A, B, and C, (ii) at least one of A, B, and C; and (iii) A, and/or B and/or C. This concept is illustrated for three elements (i.e., A, B, C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the term "exemplary" is used herein to refer to examples of embodiments and/or implementations, and is not meant to necessarily convey a more-desirable use-case.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

It is noted that the terms "operable to" can encompass the meaning of the term "adapted or configured to". In other words, a machine "operable to" perform a task can in some embodiments, embrace a mere capability (e.g., "adapted") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Where applicable, whenever a numerical range is indicated herein, it is meant to include any cited numeral (fractional or integral) within the indicated range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. A method for controlling the operation of lighting, the method comprising:
    actively illuminating a scene with pulsed light generated by at least one pulsed light source of a platform for generating reflections from the scene;
    gating in timed coordination with the active illumination of the scene, at least one of a plurality of pixel elements of at least one image sensor of the platform;
    receiving, at least some of the reflections from the scene;
    generating, reflection-based image data; and
    controlling, based on the reflection-based image data, the operation of platform lighting comprising a plurality of light sources that are configured in a matrix arrangement for simultaneously subjecting at least one first scene region and at least one second scene region to different illumination power.

2. The method of claim 1, wherein the controlling is performed to illuminate one or more different scene regions.

3. The method of claim 2, wherein the different scene regions are illuminated with broad-spectrum light.

4. The method of claim 1, wherein a plurality of different scene regions are subjected to different scene illumination intensities.

5. The method of claim 4, wherein at least two of the plurality of scene regions are subjected to at least two different scene illumination intensities during a same time period.

6. The method of claim 5, wherein the plurality of different scene regions have different reflectance and are subjected to different scene illumination intensities such to obtain, at the platform, about an equal amount of light flux reflected from the different scene regions.

7. The method of claim 1, wherein the reflection-based image data is descriptive of a scene and generated at least partially by detecting reflections obtained responsive to illuminating the scene with pulsed light, wherein the reflections are detected from a distance extending beyond a scene illumination range of the platform lighting and/or extending beyond a range corresponding to the visual acuity of a normal human visual system.

8. An illumination control apparatus for controlling the operation of lighting of a platform, the illumination control apparatus comprising:
    one or more memories and one or more processors operable to execute instructions stored in the one or more memories to cause performing the following steps:
    actively illuminating a scene with pulsed light generated by at least one pulsed light source;
    receiving, responsive to illuminating the scene with the pulsed light, reflections on at least one image sensor, the image sensor comprising a plurality of pixel elements;
    gating at least one of the plurality of pixel elements of the at least one image sensor to convert the reflections into pixel values and to generate, based on the pixel values, reflection-based image data; and
    controlling, based on the reflection-based image data, the operation of platform lighting comprising a plurality of light sources that are configured in a matrix arrangement for simultaneously subjecting at least one first scene region and at least one second scene region to different illumination power.

9. The illumination control apparatus of claim 8, wherein the one or more processors are operable to execute instructions stored in one or more memories to cause the apparatus to perform the following steps: determining, based on the reflection-based image data, a driving condition; and adaptively controlling a vehicle lighting based on the determined driving condition.

10. The illumination control apparatus of claim 8, wherein the reflection-based image data is descriptive of a depth-of-field of the scene that extends beyond an illumination range of vehicle lighting.

11. The illumination control apparatus of claim 8, wherein the controlling of vehicle lighting is performed such to avoid blinding of objects located in the scene by the illuminating vehicle lighting.

12. The illumination control apparatus of claim 8:
    wherein the one or more processors are operable to executed instructions stored in the one or more memories to cause controlling illumination of the scene with platform lighting to illuminate the at least one first scene region with a first illumination pattern that is different from a second illumination pattern of at least one second scene region.

13. The illumination control apparatus of claim 8, wherein at least one first and at least one second scene region of the plurality of scene regions are partially overlapping or non-overlapping.

14. The illumination control apparatus of claim 8, wherein the platform lighting comprises:
    a dim beam light source; a main beam light source; a spotlight; a front fog lamp; a rear fog lamp; a daytime conspicuity light source; a rear position lamp; a brake light; a reversing lamp or any combination of the aforesaid.

15. The illumination control apparatus of claim 8, wherein the at least one pulsed light source and the at least one image sensor are comprised in a platform, and arranged and configured such that the reflection-based image data is descriptive of image information of a field of view extending in a direction which is different from a current direction of travel of the vehicle in the scene.

16. The illumination control apparatus of claim 8, wherein a plurality of readout frames are employed for imaging the same DOF.

17. The illumination control apparatus of claim 8, wherein the one or more processors are operable to execute instructions stored in the one or more memories to cause controlling, based on the reflection-based image data, the operation of the plurality of light sources of the vehicle lighting.

18. The method of claim 1, wherein at least one of the first and at least one second scene region are partially overlapping or non-overlapping.

19. The method of claim 1, wherein the platform lighting comprises: a dim beam light source; a main beam light source; a spotlight; a front fog lamp; a rear fog lamp; a daytime conspicuity light source; a rear position lamp; a brake light; a reversing lamp or any combination of the aforesaid.

20. The method of claim 1, wherein the at least one pulsed light source and the at least one image sensor are comprised in the platform, and arranged and configured such that the reflection-based image data is descriptive of image information of a field of view extending in a direction which is different from a current direction of travel of a vehicle in the scene.

* * * * *